(12) United States Patent
Wexler

(10) Patent No.: US 10,424,212 B2
(45) Date of Patent: Sep. 24, 2019

(54) SYSTEMS AND METHODS FOR MONITORING, EVALUATION, AND TREATMENT

(71) Applicant: Yale University, New Haven, CT (US)

(72) Inventor: Bruce E. Wexler, Hamden, CT (US)

(73) Assignee: Yale University, New Haven, CT (US)

( * ) Notice: Subject to any disclaimer, the term of this patent is extended or adjusted under 35 U.S.C. 154(b) by 598 days.

(21) Appl. No.: 14/843,708

(22) Filed: Sep. 2, 2015

(65) Prior Publication Data

US 2016/0042649 A1    Feb. 11, 2016

Related U.S. Application Data

(63) Continuation of application No. 13/086,598, filed on Apr. 14, 2011, now abandoned.

(60) Provisional application No. 61/421,417, filed on Dec. 9, 2010, provisional application No. 61/390,238, filed on Oct. 6, 2010.

(51) Int. Cl.
*G09B 5/00* (2006.01)
*G09B 7/02* (2006.01)
*G09B 7/04* (2006.01)

(52) U.S. Cl.
CPC .............. *G09B 5/00* (2013.01); *G09B 7/02* (2013.01); *G09B 7/04* (2013.01)

(58) Field of Classification Search
CPC ... G09B 5/00; G09B 7/00; G09B 7/02; G09B 7/04; G09B 19/00; A61B 5/16
See application file for complete search history.

(56) References Cited

U.S. PATENT DOCUMENTS

| 5,065,345 A | 11/1991 | Knowles et al. |
| 5,169,319 A | 12/1992 | Potocki |
| 6,435,877 B2 | 8/2002 | Wasowicz |

(Continued)

FOREIGN PATENT DOCUMENTS

| WO | WO 2009/049404 A1 | 4/2009 |
| WO | WO 2012/064999 A1 | 5/2012 |

OTHER PUBLICATIONS

International Search Report and Written Opinion dated Jun. 28, 2012 for Application No. PCT/US2011/054561.

(Continued)

*Primary Examiner* — Jerry-Daryl Fletcher
(74) *Attorney, Agent, or Firm* — Wolf, Greenfield & Sacks, P.C.

(57) ABSTRACT

A computer-implemented method, a computer program product, and a system are provided. A plurality of multi-level cognitive exercises are provided to an individual. Each of the multi-level cognitive exercises includes at least one task to perform. The individual is requested to respond to a cognitive exercise in the plurality of cognitive exercises by performing the at least one task contained in the cognitive exercise. A response provided by the individual to the cognitive exercise is monitored. Based on the monitoring, a determination is made whether the individual performed the at least one task at a predetermined performance level, wherein the performance level is defined by the at least one task contained in the cognitive exercise. Based on the determining, the individual is requested to perform at least another task. At least one activity for the individual to perform is generated. The at least one activity is based on responses to the multi-level cognitive exercises by the individual.

20 Claims, 3 Drawing Sheets

(56) References Cited

U.S. PATENT DOCUMENTS

| | | | |
|---|---|---|---|
| 6,493,690 | B2 | 12/2002 | Bertrand et al. |
| 6,511,324 | B1 | 1/2003 | Wasowicz |
| 6,634,887 | B1 | 10/2003 | Heffernan, III et al. |
| 8,591,392 | B2 | 11/2013 | Baror et al. |
| 8,666,298 | B2 | 3/2014 | Liang et al. |
| 8,734,317 | B2 | 5/2014 | Sperling et al. |
| 2001/0046658 | A1 | 11/2001 | Wasowicz |
| 2002/0069189 | A1 | 6/2002 | Bertrand et al. |
| 2002/0103428 | A1 | 8/2002 | Decharms |
| 2003/0059750 | A1 | 3/2003 | Bindler et al. |
| 2003/0059759 | A1 | 3/2003 | Calhoun et al. |
| 2003/0212579 | A1 | 11/2003 | Brown et al. |
| 2005/0053903 | A1 | 3/2005 | Darling |
| 2005/0053904 | A1 | 3/2005 | Shephard et al. |
| 2005/0153263 | A1 | 7/2005 | De Ley et al. |
| 2006/0019227 | A1 | 1/2006 | Hardwicke |
| 2006/0184494 | A1 | 8/2006 | Klingberg |
| 2007/0065789 | A1 | 3/2007 | Goldman et al. |
| 2007/0166675 | A1 | 7/2007 | Atkins et al. |
| 2007/0293735 | A1 | 12/2007 | Chan et al. |
| 2007/0298401 | A1 | 12/2007 | Mohanty et al. |
| 2008/0038705 | A1 | 2/2008 | Kerns et al. |
| 2008/0254420 | A1 | 10/2008 | Nerenberg |
| 2009/0023977 | A1 | 1/2009 | Sperling et al. |
| 2009/0155754 | A1 | 6/2009 | Shankle et al. |
| 2009/0287619 | A1 | 11/2009 | Liang et al. |
| 2009/0306534 | A1 | 12/2009 | Pizzagalli |
| 2010/0296649 | A1 | 11/2010 | Katzenbeisser et al. |
| 2011/0118534 | A1 | 5/2011 | Baror et al. |
| 2012/0077160 | A1 | 3/2012 | DeGutis et al. |
| 2012/0088216 | A1 | 4/2012 | Wexler |
| 2012/0221075 | A1 | 8/2012 | Bentwich |
| 2012/0282578 | A1 | 11/2012 | Chapman et al. |
| 2013/0101976 | A1 | 4/2013 | Roots et al. |
| 2015/0351655 | A1 | 12/2015 | Coleman |
| 2016/0133149 | A1 | 5/2016 | Wexler |

OTHER PUBLICATIONS

International Preliminary Report on Patentability dated Apr. 18, 2013 for Application No. PCT/US2011/054561.
[No Author Listed], Brain Training That Works. brainHQ. 2015. http://www.brainhq.com/# [last accessed Dec. 2, 2015]. 2 pages.
[No Author Listed], MindUP™. The Hawn Foundation. 2015. http://thehawnfoundation.org/mindup [last accessed Dec. 2, 2015]. 6 pages.
[No Author Listed], We Empower: Educator. BrainWare Safari. 2015. http://www.mybrainware.com/who-we-help/educator [last accessed Dec. 2, 2015]. 3 pages.
[No Author Listed], What is Beating the Blues? beatingtheblues: cognitive behavioural therapy. 2015. http://www.beatingtheblues.co.uk/patients/introduction/whatisit [last accessed Dec. 2, 2015]. 1 page.
[No Author Listed], What is CBT? Cobalt Therapeutics. http://cobalttx.com/about.html [last accessed Dec. 2, 2015]. 1 page.
Alexopoulos et al., BDNF val66met polymorphism, white matter abnormalities and remission of geriatric depression. J Affective Disorders. 2010;15(1-3):262-8. doi: 10.1016/j.jad.2010.02.115. Epub Sep. 1, 2011. 13 pages.
Alexopoulos et al., Executive dysfunction, heart disease burden, and remission of geriatric depression. Neuropsychopharm. 2004;29(12):2278-84.
Alexopoulos et al., Frontal white matter microstructure and treatment response of late-life depression: a preliminary study. Am J Psych. 2002;159(11):1929-32.
Alexopoulos et al., Microstructural white matter abnormalities and remission of geriatric depression. Am J Psych. 2008;165(2):238-44. doi: 10.1176/appi.ajp.2007.07050744.
Bäckman et al., Role of the dopamine systems in cognitive againg. Cognitive Neuroscience of Aging. Cabeza et al., ed. Oxford University Press, New York, NY. 2005;58-84. doi: 10.1093/acprof:oso/9780195156744.003.0003. Epub May 2009. 30 pages.
Berry et al., The influence of perceptual training on working memory in older adults. PLoS One. 2010;5(7):e11537. 8 pages.
Bherer et al., Transfer effects in task-set cost and dual-task cost after dual-task training in older and younger adults: further evidence for cognitive plasticity in attentional control in late adulthood. Exp Aging Res. 2008;34(3):188-219. doi: 10.1080/03610730802070068. Epub Mar. 25, 2010. 24 pages.
Choi et al., Intrinsic motivation and learning in a schizophrenia spectrum sample. Schizophr Res. 2010;118(1-3):12-9. doi: 10.1016/j.schres.2009.08.001. Epub May 1, 2011. 16 pages.
De Villers-Sidani et al., Recovery of functional and structural age-related changes in the rat primary auditory cortex with operant training. Proc Natl Acad Sci U S A. 2010;107(31):13900-5. doi: 10.1073/pnas.1007885107. Epub Jul. 19, 2010. 6 pages.
Gunning-Dixon et al., Anterior cingulate cortical volumes and treatment remission of geriatric depression. Int J Ger Psych. 2009;24(8):829-36. doi: 10.1002/gps.2290. Epub Aug. 1, 2010. 13 pages.
Gunning-Dixon et al., MRI signal hyperintensities and treatment remission of geriatric depression. J Affect Disord. Nov. 2010;126(3):395-401. doi: doi: 10.1016/j.jad.2010.04.004. Epub Nov. 1, 2011. 13 pages.
James et al., Cognitive Behavior Therapy and Executive Functioning in Depression. J Cogn Psych. 2008;22(3):210-8. doi: 10.1891/0889-8391.22.3.210.
Kiosses et al., Psychosocial interventions for late-life major depression: evidence-based treatments, predictors of treatment outcomes, and moderators of treatment effects. Psychiatr Clin North Am. Jun. 2011;34(2):377-401. dio:10.1016/j.psc.2011.03.001. Epub Jun. 1, 2012. 23 pages.
Lövdén et al., Experience-dependent plasticity of white-matter microstructure extends into old age. Neuropsychologia. 2010;48(13):3878-83. doi: 10.1016/j.neuropsychologia.2010.08.026.
Mahncke et al., Memory enhancement in healthy older adults using a brain plasticity-based training program: a randomized, controlled study. Proc Natl Acad Sci U S A. 2006;103(33):12523-8.
Morimoto et al., Executive function and short-term remission of geriatric depression: the role of semantic strategy. Am J Ger Psych. 2011;19(2):115-22. doi: 10.1097/JGP.0b013e3181e751c4. Apr. 17, 2013. 11 pages.
Morimoto et al., Neuroplasticity-based computerized cognitive remediation for geriatric depression. Int J Ger Psych. 2012;27(12):1239-47. doi: 10.1002/gps.3776. Epub Dec. 1, 2013. 15 pages.
Morimoto et al., Semantic organizational strategy predicts verbal memory and remission rate of geriatric depression. Int J Ger Psych. 2012;27(5):506-12. doi: 10.1002/gps.2743. Epub May 1, 2013. 12 pages.
Mozolic et al., A cognitive training intervention improves modality-specific attention in a randomized controlled trial of healthy older adults. Neurobiol Aging. Apr. 2011;32(4):655-68. doi: 10.1016/j.neurobiolaging.2009.04.013. Epub Apr. 1, 2012. 26 pages.
Mozolic et al., A cognitive training intervention increases resting cerebral blood flow in healthy older adults. Frontiers Human Neurosci. 2010;4:16. doi: 10.3389/neuro.09.016.2010. 10 pages.
Smith et al., A cognitive training program based on principles of brain plasticity: results from the Improvement in Memory with Plasticity-based Adaptive Cognitive Training (IMPACT) study. J Am Ger Soc. 2009;57(4):594-603. doi: 10.1111/j.1532-5415.2008.02167.x. Epub Sep. 19, 2014. 19 pages.
Takeuchi et al., Training of working memory impacts structural connectivity. J Neurosci. Mar. 3, 2010;30(9):3297-303.
Takeuchi et al., White matter structures associated with craetivity: evidence from diffusion tensor imaging. Neuroimage. 2010;51(1):11-8.
Thase et al., Remission rates during treatment with venlafaxine or selective serotonin reuptake inhibitors. Br J Psych. 2001;178:234-41.
[No Author Listed] Educational Toys—Learning Games. Basic Knowledge 101. www.basicknowledge101.com/resources/educationaltoys.html, last accessed Mar. 12, 2018, 16 pages.

(56) References Cited

OTHER PUBLICATIONS

Alexopoulos, Depression in the elderly. Lancet. 2005;365(9475):1961-70.

Alexopoulos et al., Executive dysfunction and long-term outcomes of geriatric depression. Arch Gen Psych. 2000;57(3):285-90.

Alexopoulos et al., Executive dysfunction and the course of geriatric depression. Biol Psych. 2005;58(3):204-10.

Bao et al., Temporal plasticity in the primary auditory cortex induced by operant perceptual learning. Nat Neurosci. 2004;7(9):974-81.

Bao et al., Cortical remodelling induced by activity of ventral tegmental dopamine neurons. Nature. 2001;412(6842):79-83.

Bherer et al., Testing the limits of cognitive plasticity in older adults: application to attentional control. Acta Psychol. 2006;123(3):261-78.

Bor et al., Prefrontal cortical involvement in verbal encoding strategies. Eur J Neurosci. 2004;19(12):3365-70.

Davies et al., The human perirhinal cortex and semantic memory. Eur J Neurosci. 2004;20(9):2441-6.

Dombrovski et al., Reward/Punishment reversal learning in older suicide attempters. Am J Psych. 2010;167(6):699-707.

Erickson et al., Training-induced plasticity in older adults: effects of training on hemispheric asymmetry. Neurobiol Aging. 2007;28(2):272-83.

Folstein et al., "Mini-mental state". A practical method for grading the cognitive state of patients for the clinician. J Psych Res. 1975;12(3):189-98.

Golden, A group version of the Stroop Color and Word Test. J Pers Assess. 1975;39(4):386-8.

Kalayam et al., Prefrontal dysfunction and treatment response in geriatric depression. Arch Gen Psych. 1999;56(8):713-8.

Kay-Lambkin et al., Computer-based psychological treatment for comorbid depression and problematic alcohol and/or cannabis use: a randomized controlled trial of clinical efficacy. Addiction. Mar. 2009;104(3):378-88.

Kiosses et al., Executive dysfunction and disability in elderly patients with major depression. Am J Ger Psych. 2001;9(3):269-74.

Lingjaerde et al., The UKU side effect rating scale. A new comprehensive rating scale for psychotropic drugs and a cross-sectional study of side effects in neuroleptic-treated patients. Acta Psych Scand Suppl. 1987;334:1-100.

Mahncke et al., Brain plasticity and functional losses in the aged: scientific bases for a novel intervention. Prog Brain Res. 2006;157:81-109.

Mora et al., Aging, plasticity and environmental enrichment: structural changes and neurotransmitter dynamics in several areas of the brain. Brain Res Rev. 2007;55(1):78-88.

Mozolic et al., A cognitive training intervention increases resting cerebral blood flow in healthy older adults. Frontiers in Human Neuroscience. 2010;4(16):1.

Murphy et al., Longitudinal association of initiation/preservation and severity of geriatric depression. Am J Ger Psych. 2004;12(1):50-6.

Persson et al., Retraction of Gaining control: training executive function and far transfer of the ability to resolve interference. Psychol Sci. 2011;22(4):562.

Sneed et al., Response inhibition predicts poor antidepressant treatment response in very old depressed patients. Am J Ger Psych. 2007;15(7):553-63.

Zimmerman et al., Derivation of a definition of remission on the Montgomery-Asberg depression rating scale corresponding to the definition of remission on the Hamilton rating scale for depression. J Psych Res. 2004;38(6):577-82.

SYSTEMS AND METHODS FOR MONITORING, EVALUATION, AND TREATMENT

CROSS-REFERENCE TO RELATED APPLICATIONS

The present application is a continuation of and claims the benefit under 35 U.S.C. 120 of U.S. patent application Ser. No. 13/086,598, which was filed in the U.S. Patent and Trademark Office on Apr. 14, 2011, which claims priority to U.S. Provisional Patent Application No. 61/421,417 to Wexler, filed Dec. 9, 2010, and entitled "INTEGRATED BRAIN/BODY EDUCATIONAL ENHANCEMENT PROGRAM", and incorporates disclosure of this application herein by reference in its entirety. The present application also claims priority to U.S. Provisional Patent Application No. 61/390,238 to Wexler, filed Oct. 6, 2010, and entitled "Integrated Brain, Behavior and Social Program to Enhance Cognitive Development," and incorporates disclosure of this application herein by reference in its entirety.

STATEMENT OF GOVERNMENT SUPPORT

This invention was made with government support under R01 DA019039, R01 MH061493, R25 MH071240, R01 MH080048, R01 MH084079 awarded by the National Institute of Health. The government has certain rights in the invention.

TECHNICAL FIELD

The subject matter described herein relates to data processing and in particular, to evaluating an individual and developing programs and treatments based on individual's abilities.

BACKGROUND

Education has two main components. One is teaching information (e.g., facts). The other is improving the individual's thinking abilities, things like memory, problem solving, and creative thinking School pedagogy has focused primarily on the first of the two—teaching information. The effort to improve thinking has almost exclusively been through learning the information. For example, attention and memory were strengthened by having students memorize list of facts and recite poems from memory. The focus on conveying information has been necessary because very little was known about how to directly strengthen thinking itself. Recent advances in cognitive science and neuroscience, along with modern computer technology, make possible a change in education. Computer-based brain exercises and specific physical exercises synergistically and powerfully promote development of the neurocognitive foundations of thought. This means that education can move from a primary focus on learning facts to a balanced curriculum that equally and directly promotes development of thinking itself.

Attention deficit hyperactivity disorder ("ADHD") is a neurodevelopmental disorder marked by a failure to develop age-appropriate executive functions to sustain and direct attention, inhibit response to task-irrelevant stimuli and contain and down regulate internally generated urges for action. A variety of other cognitive functions are compromised, perhaps in part secondary to the aforementioned deficits and perhaps as part of the primary pathology. These include a group of cognitive operations often labeled "executive functions" that depend heavily on activity in the frontal and parietal lobes, areas of the brain actively developing when the full array of functions compromised in ADHD are themselves developing and when symptoms of ADHD often lead to clinical diagnosis. This complex of dysfunctions exacerbates one another and alters interactions with the social environment so as to limit opportunities that promote normal development and create experiences that promote deviant development. By the time individuals with ADHD are teenagers and young adults they over represented among drug users, criminals and the un- and under-employed. With an estimated prevalence world wide of 5%, ADHD is a significant public health problem associated with high individual, family and social costs. Similar knowledge from cognitive and neuroscience and computer technology can also be used to treat childhood neurodevelopmental disorders such as ADHD, as well as the cognitive deficits associated with neuropsychiatric disorders. These treatment programs are neuroscience and brain based, but non-pharmacologic.

Thus, there is a need to incorporate physical activity and cognitive exercises to generate educational programs and/or to treat psychiatric disorders, which include exercises designed specifically to engage and promote development of specific neurocognitive systems implicated by the disorder, and to integrate such exercises with computer exercises that engage those same neurocognitive systems.

SUMMARY

In some implementations, the current subject matter relates to a computer-implemented method. The method includes providing a plurality of multi-level cognitive exercises to an individual. Each of the multi-level cognitive exercises includes at least one task to perform. The individual is requested to respond to a cognitive exercise in the plurality of cognitive exercises by performing the at least one task contained in the cognitive exercise. A response provided by the individual to the at least one task contained in the cognitive exercise is monitored. Based on the monitoring, it is determined whether the individual performed the at least one task at a predetermined performance level. The predetermined performance level is defined by the at least one task contained in the cognitive exercise. Based on the determining, the individual is requested to perform at least another task. At least one activity for the individual to perform is generated. At least one activity is based on responses to the multi-level cognitive exercises by the individual.

In some implementations, the current subject matter can include at least one of the following optional features. At least another task can include at least one of the following: at least another task in the cognitive exercise, at least one task in another cognitive exercise in the plurality of multi-level cognitive exercises, and the at least one task that has been altered. At least one activity can include at least one of the following: at least one cognitive exercise and at least one physical activity. Based on the generated activity, an individual development plan for the individual can be generated. Each level in the multi-level cognitive exercises contains a different task to perform, wherein each next level in the multi-level cognitive exercises contains a more difficult task to perform than a task in a preceding level in the multi-level cognitive exercises. The individual is not allowed to perform a task contained in the next level until the individual correctly performs a task contained in the preceding level.

The monitoring further includes determining that the individual incorrectly performed the at least one task; generating an error message indicating that the individual incorrectly performed the task, analyzing a performance of the at least one task by the individual, providing, based on the analyzing, a suggestion to the individual on how to correctly perform the at least one task, and allowing the individual to perform the at least one task again. The analyzing further includes determining an error type corresponding to the incorrect performance of the at least one task by the individual. The generating the error message further includes generating an alert to the individual indicating the error message, wherein the alert includes at least one of the following: an audio message, a video message, and a combination of an audio message and a video message. The at least another task can include the at least one task that has been altered based on the error type. The monitoring further includes defining, based on the predetermined performance level, at least one plateau performance criterion to indicate performance of the at least one task by the individual at a first performance level, at least one graduation performance criterion to indicate performance of the at least one task by the individual at a second performance level, wherein the second performance level is higher than the first performance level, determining a performance level at which the individual performed the at least one task and whether the individual correctly performed the at least one task, and comparing, based on the determining, the performance level at which the individual performed the at least one task with the at least one of the first performance level and the second performance level. The method can also include allowing the individual to perform at least another task included in the multi-level cognitive exercises based on the individual performing the at least one task at least one of the first performance level and the second performance level. At least one performance level, the first performance level, the second performance level can include at least one of the following: a predetermined time allotted for performance of the at least one task, a predetermined speed for performing the at least one task, and a predetermined accuracy of performing the at least one task. The method can also include determining whether the individual correctly and at at least one of the first predetermined level and the second predetermined level predetermined for each task performed all tasks in the plurality of multi-level cognitive exercises, allowing, based on the determination, the individual to perform at least another task contained within at least another plurality of multi-level cognitive exercises.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
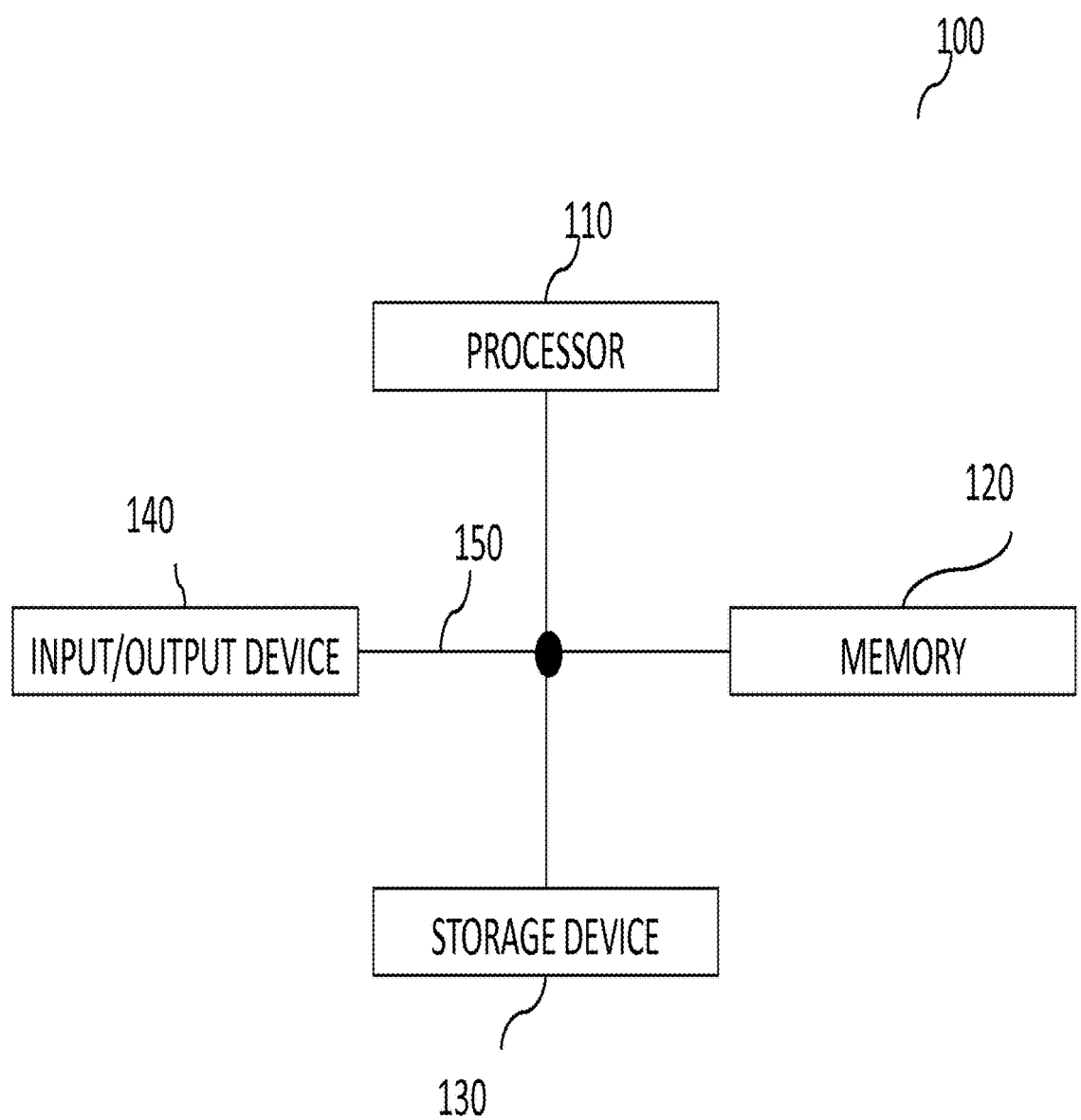
FIG. 1 illustrates an exemplary system, according to some implementations of the current subject matter.

In some implementations, the current subject matter can be configured to be implemented in a system 100, as shown in FIG. 1. The system 100 can include a processor 110, a memory 120, a storage device 130, and an input/output device 140. Each of the components 110, 120, 130 and 140 can be interconnected using a system bus 150. The processor 110 can be configured to process instructions for execution within the system 100. In some implementations, the processor 110 can be a single-threaded processor. In alternate implementations, the processor 110 can be a multi-threaded processor. The processor 110 can be further configured to process instructions stored in the memory 120 or on the storage device 130, including receiving or sending information through the input/output device 140. The memory 120 can store information within the system 100. In some implementations, the memory 120 can be a computer-readable medium. In alternate implementations, the memory 120 can be a volatile memory unit. In yet some implementations, the memory 120 can be a non-volatile memory unit. The storage device 130 can be capable of providing mass storage for the system 100. In some implementations, the storage device 130 can be a computer-readable medium. In alternate implementations, the storage device 130 can be a floppy disk device, a hard disk device, an optical disk device, a tape device, non-volatile solid state memory, or any other type of storage device. The input/output device 140 can be configured to provide input/output operations for the system 100. In some implementations, the input/output device 140 can include a keyboard and/or pointing device. In alternate implementations, the input/output device 140 can include a display unit for displaying graphical user interfaces. In some implementations, the current subject matter can be implemented as a World Wide Web-based or Internet-based application, a platform, collection of applications, etc. whereby a user of the can access functionalities and operations discussed below via user's computing system (e.g., a processor, a keyboard, a mouse, and a monitor). Such applications can be written in various computer languages (e.g., Java, C++, HTML, etc.) and/or can be executed using user's Internet browser program(s) or separately-loadable application(s) that can execute such applications either locally on the user's computer and/or using World Wide Web or any other network. Such World Wide Web-base or Internet-based applications can be configured to provide further interactivity to the functionalities and operations discussed below and allow remote interaction between users of such applications in a variety of environments (e.g., teacher-student, doctor-patient, etc.).

Figure 2:
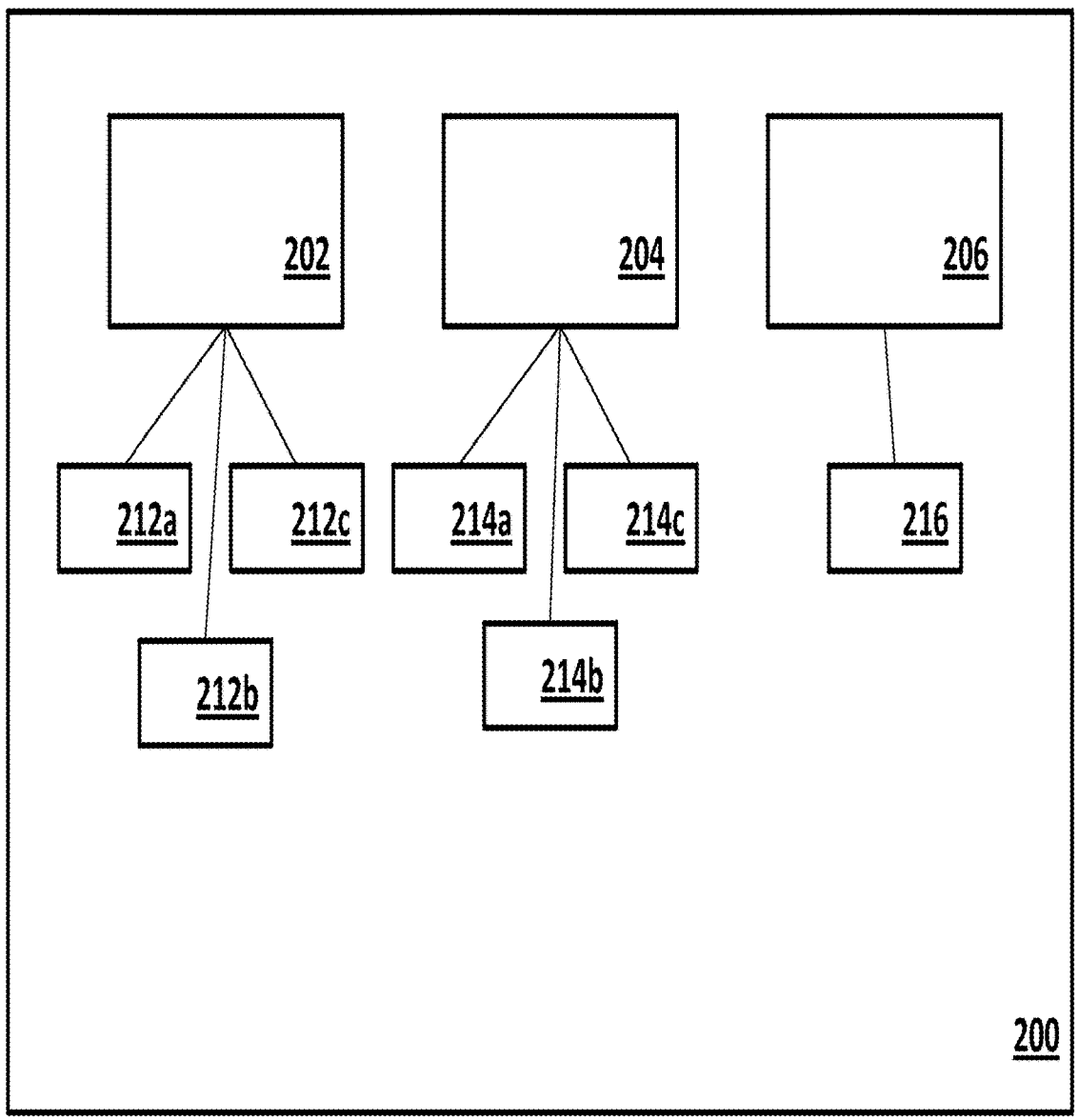
FIG. 2 illustrates an exemplary system for evaluating an individual, according to some implementations of the current subject matter.

FIG. 2 is a block diagram of an exemplary system 200 for integrating psychological, physiological, and social aspects of an individual to develop an educational or a treatment program that is tailored to that particular individual, according to some implementations of the current subject matter. The system 200 may be configured to be implemented using a system 100 shown in FIG. 1. The system 200 includes a computerized cognitive remediation component 202, a physical exercise component 204, and a social behavior component 206. Components 202, 204, and 206 may be used to analyze an individual, including his/her psychological abilities (e.g., cognitive functions), physiological abilities, social behavior patterns, etc., and based on such analysis develop an educational or a treatment program that is tailored to that individual. In some implementations, such program can be used to create a teaching plan that may be tailored to each student's abilities, or create an individualized treatment plan to treat an attention deficit hyperactivity disorder, or any other disorders.

Components 202, 204, and 206 may also include sub-components 212 (a, b, c), 214 (a, b, c), and 216, respectively. Components 212 may be used for analyzing and targeting particular individual's psychological abilities (e.g., cognitive functions). As shown in FIG. 2, sub-component 212a can be a "catch-the-ball" computer game that can be presented to an individual in order to provoke individual's response to particular computer prompts. Based on individual's responses to the prompts, individual's abilities can be analyzed and based on the analysis, an appropriate course of action or further plan can be determined. Sub-component 212b may be a "balloons/butterflies" game computer game that may also be used to elicit individual's responses and further the analysis of the individual's abilities. Sub-component 212c may be "what comes next?" computer game that may also assist in determining individual's abilities. Each of these components is discussed in further detail below. Sub-components 214 may be various physical exercises and/or activities that may be performed by the individual. Sub-components 216 may be various social behavior patterns and/or activities (e.g., a known Good Behavior Game, which is a reinforcement-based group management strategy, in which a teacher divides a class into two teams, whereby the students and teacher define disruptive behaviors and determine how many "fouls" may be allowed; each team's goal is have a score under the number of allotted "fouls"; the classroom teacher may use an event recording (frequency) data collection system. The team that stays below this number is the winner. If both teams accomplish this, both teams are rewarded. Typically, the rewards are natural privileges available in most classrooms.) The sub-components 214 and 216 may be used in conjunction with the sub-components 212 to analyze and develop a program or a plan tailored to a particular individual. Such program may be used for educational purposes, treatment, and/or any other purposes. The components and sub-components shown in FIG. 2 are provided for illustrative purposes only and are not intended to limit the scope of the subject matter.

Some implementations of the current subject matter may be configured to allow usage of brain and cognitive exercises in computer games and/or other computer-related/computer-based operations, activities, functions, programs, etc. that allow for a more intensive and continuous activation of targeted neural processes in an individual. In some implementations, the targeted exercises may be directed to or otherwise address specific cognitive, mental, etc. areas and/or needs of an individual (for example, tracking movement of an object on a computer screen may be designed to address individual's cognitive processes that are responsible for reaction/response time). While the individual is performing such computer game exercises, the individual may be monitored periodically (e.g., every 5 seconds, 10 seconds, etc.) to determine individual's responsiveness posed by the challenges of these exercises. Based on such responses, difficulty of the exercises may be adjusted appropriately to provide an optimal difficulty for that particular individual. Current subject matter may be configured to provide individualized difficulty levels for each individual performing the same exercises.

In some implementations, the component 202 may be configured to provide multiple different exercises, exercise variations, and/or difficulties of exercises each being designed to focus on different aspects of cognition that are actively developing in the individual. Because each individual may have his/her own profile of cognitive strengths and weaknesses, each individual may benefit from special attention in areas that are more difficult for them. The current subject matter may be configured to use graduation and plateau criteria for each exercise and automatically move the individual at an appropriate speed through areas of individual strength and spend more time exercising areas of relative weakness. At the same time, proper setting of the graduation and plateau criteria may avoid frustration and inefficiency of keeping individuals working too long in areas where they have achieved their maximum capability at that particular time. The current subject matter may be configured to later return to areas of relative weakness to determine whether the individual is then capable of performing such exercises. In some implementations, the plateau criterion or criteria may be configured to define a predetermined level of performance by the individual performing particular exercise(s) or task(s) or problem(s) in exercises for which the plateau criterion/criteria are defined. Such predetermined level may include at least one of the following: speed, time, accuracy, etc. with which the individual completes the entire exercise, a portion or portions of an exercise, etc. Each exercise may contain at least one difficulty level and the individual may advance to the next level by reaching the plateau criterion/criteria. In some implementations, the plateau criterion/criteria may indicate that the individual is performing the exercise/exercises at a particular predetermined level (e.g., performing exercises at a particular speed without changing the speed, or performing the exercises during a particular time period without reducing the time period). The graduation criterion/criteria may be defined by an individual correctly performing particular exercises or tasks at a predetermined level defined by the exercise (e.g., consecutively performing tasks defined by an exercises at a fastest speed in a correct manner (see, examples discussed below)). Upon reaching the graduation criterion/criteria, the individual may be advanced to the next difficulty level of an exercise or a group of exercises. In some implementations, the plateau and/or graduation criteria may be referred to as a predetermined performance level, where the plateau criterion/criteria may define a first performance level and the graduation criterion/criteria may a second performance level such that the second performance level is more difficult than the first performance level (e.g., second performance level may correspond to performing the task/problem/exercise at a fastest possible speed, whereas the first performance level may correspond to performing the task/problem/exercise at a low speed and without changing the speed).

System 200 may be also configured to record and evaluate thousands of individual's responses during each training session, and many tens of thousands of responses during the course of the program that may be developed for that individual. The program may recognize various different types of errors (e.g., 40 different types) and generate reports that characterize types of errors that an individual may make. The system 200 may be also configured to generate error messages and provide corrective strategy messages to individuals during exercises being performed by the individual. When the individual makes a specific type of error or makes an error more often than a predetermined number of times, the system 200 may automatically provide a corrective strategy message to the individual (or someone observing the individual) and an example of how to perform the exercise correctly. Further, for some errors, the system 200 may also make a temporary change in the way the exercise is presented to the individual so as to, for example, make it easier to see, understand and/or perform correctly. When the individual responds correctly to the same type of problems over a few trials after the corrective strategy message, the system 200 may provide a reward. In some implementations, the system 200 may be configured to provide an intelligent detection of errors made by the individual by detecting the error and the error type made by the individual, analyzing it, and then providing a corrective strategy to the individual (e.g., advising the individual of the error committed and showing how to perform the exercise correctly, or changing the exercise to reduce difficulty level of an exercise, etc.). The system 200 may also generate an indication of specific error type messages in substantially real time (e.g., as the exercise is being done) and provide immediate feedback to the individual to allow the individual to self-correct the error.

The system 200 may be also configured to generate an attention alert. One specific type of error of particular relevance to some individuals is a loss of focus on a task at hand (e.g., presented by a particular exercise) with an associated loss of essential task-relevant information. This may lead to missed or incorrect responses. It may also lead to frustration and negative feedback for poor performance, often compounding the initial inattention. It also means that the higher level processing that depends on the task-relevant sensory input is compromised or aborted, leading to under activation of those neural systems and lost opportunity to strengthen functional links between lower and higher level processes that can strengthen and stabilize the focusing of attention and associated initial sensory information intake. To address this, system 200 may include an attention alert function that may be enabled as needed (e.g., by a third party or by system 200's online error diagnostics). The attention alert function may use a variety of methods to provide general pre-target alerts and to increase target salience.

System 200 may be configured to integrate cognitive exercises with physical activities. The system 200 may incorporate specific physical activities selected to work synergistically with the classroom computer exercises. The system 200's physical activity component may be configured to allow selection of particular physical activities to address neurocognitive developmental processes. Such exercises may include sports, games, dances, gymnastics, martial arts, etc. The physical activities can be specifically tailored to the individual.

In some implementations, the system 200 can be used in a classroom social intervention to limit classroom behaviors that disrupt a teaching environment, such as out of seat behavior and blurting out by students. The system 200 may use a "good behavior game" to increase participation in the computer and physical activities by the students. Further, because both the computer and sports activities aim to activate and strengthen neural systems of self-control and the system 200 may activate and strengthen these same systems through social level reward and peer pressure.

In educational setting, the system 200 online error diagnostics may provide information for the classroom teacher about overall and specific strengths and weaknesses of each student as an aid to an individualized education. For school principals, the reports may identify students with special talents or special needs from each class as an aide to supervision of teachers with regard to identifying and working appropriately with these special students. At a district level, the information may help identify possible curricular needs to address specific aspects of thinking, some of which might be addressed through further development of system 200 itself. At the state and national levels, performance information on the system 200's computer programs may help identify unusually gifted students for further evaluation and consideration for special educational programs and settings.

In some implementations, system 200 may provide treatment options for attention deficit hyperactivity disorder ("ADHD") in children. ADHD is a neurodevelopmental disorder characterized by deficits in multiple aspects of attention and other self-regulatory executive functions. Children with ADHD may show delayed and incomplete development of these processes and associated brain functional systems. The system 200 may be designed to enhance development of these systems in healthy children.

System 200 may be configured to use computer technology to direct neuroplastic processes, synergistically integrate brain, body and social interventions, and maintain intensity of intervention. The system 200 may continuously adjust task difficulty to optimally engage targeted neurocognitive systems of attention, response inhibition and executive function, categorize types of errors, provide specific corrective strategy messages, and fold-in or phase out target alert and attention focusing cues as the individual's own competence requires. Physical exercises may activate same neurocognitive systems in the context of whole body and inter-personal activity.

System 200 may be configured to continuously monitor performance and increase task difficulty to maintain optimal challenge and also use graduation and performance plateau algorithms so that the individual spends less time doing exercises in areas of strength and more in areas of weakness. System 200 may further individualize treatment. System 200 may be configured to deal with the problem of inter-individual differences in specific areas of strengths and weaknesses. Further, system 200 may examine responses of thousands of training trials to generate online error diagnostics and corrective strategy messaging. The system 200 may provide pre-target alerts and visual target enhancements to engage the relevant neural systems, and gradually phase out these features as internal competence develops. System 200 also may produce reports for clinicians, teachers, and/or any other third parties to help inform other aspects of the individual's treatment and/or education.

The following is a discussion of each of the components 202 and 204 of the system 200 shown in FIG. 2.

Computerized Cognitive Remediation Component

As stated above, the computerized cognitive remediation component 202 may include three or more sub-components 212a, 212b, and 212c. The sub-component 212a or the "catch-the-ball" game component. The game may be presented to an individual on a computer monitor. The game may require individuals to follow one or more balls bouncing randomly across the screen and to click on them using a computer mouse when the ball turns a color that matches current target criterion. At the most basic level, the sub-component 212a may be a simple continuous performance task and the individual has to click on the ball whenever it changes from the default color (e.g., yellow) to a target color (e.g. red). At successive levels of greater difficulty, a third color (e.g., blue) balls may be introduced first as foils to be always ignored and then as targets when the target switches randomly between red and blue as indicated on the screen (e.g., the computer screen may have a section that provides instructions, messages, etc. to the user). In some implementations, a fourth color (e.g., green) balls may be added but not as targets. The sub-component 212a may include a working memory based target criterion that may identify a particular target that the individual should reach during the game. Such criterion may be introduced so that the ball is a target when it has the same color as the one before. After the individual progresses through all variations with one ball bouncing across the screen, the variations may be repeated using two balls, then three balls, and so on. With multiple balls on the screen, the memory based criterion may separately apply to a history of each ball that bounced across the computer monitor. Thus, the current target may be red for one of the bouncing balls and blue for another. In some implementations, the task's structure may provide a framework and an opportunity to activate and, thereby, further the development of multiple neurocognitive systems by engaging individual's frontal brain regions and/or distributed functional brain system components of the multiple neurocognitive systems. The above discussion is provided here for exemplary and illustrative purposes only and is not intended to limit the scope of the subject matter described herein. For example, in some implementations, the individual may be requested to "catch" any objects that may be moving across individual's computer screen (e.g., animals, fruits, vegetables, cars, trains, planes, etc.). Also, such objects can change from one object to another throughout the exercise at any time. Additionally, the individual's cursor, the movement of which corresponds to the movement of the computer mouse by the individual, can be represented by any object, e.g., an arrow, a clock, or any other object. In some implementations, the cursor can be tailored to a particular exercise that the individual is asked to perform. For example, the cursor can be a net and the object moving across the screen can be a ball; or, the cursor can be a cat and the object is a mouse. The objects and the cursors can change periodically, automatically, and/or at random times. In some implementations, the individual may be provided with an instruction to catch a particular object (e.g., "catch a mouse", or "catch a mouse when cursor turns into a cat", etc.). The following discussion is provided in terms of the described "catch-the-ball" exercise, but can be applicable to any type of exercise discussed above.

The game may have different levels and/or sub-levels of difficulty that may correspond to the number of balls bouncing across the screen and/or colors of the balls. Within each level there may be multiple sub-levels of increasing difficulty. Such difficulty may be based on a progressively shorter duration of the color change that may indicate possible targets. In some implementations, the time that the individual is provided to respond to the color change of the target may remain fixed throughout the game or may vary according to the level of the game. Also, this time may be longer than the duration of the color change. At each of the sublevels, the speed with which the ball(s) move across the screen may become faster or slower as the individual's errors decrease or increase. This allows the system 200 to perform an adaptive tracking of the individual's performance. Each sub-level and/or level may include predetermined graduation criteria corresponding to the speed with which the individual responds to the color change of the target and an accuracy with which the individual identifies the target. When the individual reaches such predetermined graduation criteria of speed and accuracy, he/she may proceed to the next sub-level and/or level. Once all sub-levels of a level are satisfactorily completed (i.e., for each sub-level, the individual met the respective predetermined graduation criteria), the individual may proceed to the next level, where each level may be defined by a different target criterion and sub-levels, e.g., by duration of color changes defining a target.

Since some individuals might not be able to function at faster speeds necessary to challenge other individuals, the system 200 may also include "plateau criteria" to detect performance asymptotes or individual ceilings. Individuals may proceed to the next sublevel and level, when plateau criteria and/or graduation criteria are met. The different levels of "catch-the-ball" game may require a sustained attention, a response inhibition, an executive or a working memory directed attention, and/or divided and switching attention.

Another sub-component 212b, called "butterflies," may be used to add further complexity to the individual's tasks. This sub-component may also be implemented on the computer monitor. Using this sub-component, butterflies (or any other objects) may appear on and move across the screen carrying signs with pictures, words or numbers on them. In this sub-component, target criteria may also be identified. The individual may be asked to click on butterflies that are carrying things that are members of a target category before the butterfly carries the sign off the screen. One of the target categories may be numbers. The individual may be asked to click on every butterfly carrying a number (e.g., "1", "2", etc.) or the name of a number (e.g., "one", "two", etc.). Other categories may be "natural" or "basic" categories such as animals, plants, furniture, etc. Lower level categories may include small animals. Further categories may be "functional" or "temporary" categories (e.g., things found in a house, things that may be taken on a vacation, modes of transportation, etc.). Further examples of categories may include finding two things on the screen at the same time that go together in some way, e.g. "two things where one is used to make the other." As with sub-component 212a, within each of these levels there are sublevels based on the number of butterflies present on the screen at the same time. Within each of the sublevels, performance may be tracked and the speed at which the butterflies fly across the screen may be adjusted accordingly. Similar to the sub-component 212a, there exist predetermined graduation and plateau criteria that may govern movement from one sub-level and/or level to the next. This exercise may involve individual's sustained attention, response inhibition, visual searching and executive rule based direction of attention, as well as different aspects of category formation and use.

The sub-component 212c or "what comes next/what came before?" exercise, can be also presented on the computer screen. In this exercise, there may be four boxes for stimuli on one row and three more on a second row beneath the first. Stimuli may be presented in three of the four boxes on the first row and in all three boxes on the second row. The individual may be asked to determine a relationship among the stimuli in the first row and select the stimulus in the second row that fits the empty spot in the sequence evident on the first row. For example, if all three stimuli in the first row are green circles, then the correct choice from the second row is the green circle. If, the first row shows a green circle, a red triangle and another green circle, the correct choice is a red triangle. If the first row contains the numbers 9-7-5, the correct choice from the second row is "3." In different levels of this exercise, different types of rules may define relationships among the items in the first row. These include category principles like color, shape, numeric sequencing rules, visual rotations, etc. Individual's performance may be tracked and within each level stimuli may be presented for progressively shorter periods of time to require faster information processing and increase difficulty. Graduation and plateau criteria may be used again to allow the individual to proceed from one level to the next. This exercise may involve sustained attention, response inhibition, use of categories and very active storage and manipulation of information in working memory.

In some implementations, the component 202 may be configured to provide an automatic individualization of treatment for the individual. Using graduation and plateau criteria, the system 200 may be configured to advance individuals through exercises quickly, such as, in areas of their strength, keep the individuals working longer in areas of their weaknesses, and avoid keeping the individuals from working on exercises for too long after their maximum gain has been reached. In this way, the treatment may be tailored to specific capabilities of the individual. As stated above, the system 200 may be configured to provide online error diagnostics of individual's performance and online corrective strategy messaging. When an individual makes a specific type of error above a criterion frequency, the system 200 may be configured to automatically provide a corrective strategy message and an example of how to do the problem correctly. For some errors, the system 200 may make a temporary change in the way the stimulus or problem is presented to the individual so that the individual may be better able to understand the problem and what is required of the individual to solve this particular problem. When the individual responds correctly to the same type of problems over a few trials after the corrective strategy message, the system 200 may be configured to provide a reward. The system 200 may be further configured to provide an attention alert. For example, such alerts may be useful for individuals suffering from ADHD, which may entail a loss of focus on the task at hand with an associated loss of essential task-relevant information. The system 200 may be configured to generate an attention alert, such as an auditory alert, a visual alert, and/or a combination of both.

2. Physical Exercise Component

The physical exercise component 204 may be used in combination with the component 202 to develop an appropriate educational program or a treatment plan for a particular individual. The component 204 can include a variety of physical exercises that may activate same neurocognitive systems targeted by the computer-based cognition training programs, discussed above. Such exercises may be programmed systemically from a single task to multiple tasks, from a simple movement to more complicated exercises and with different requirement for reaction time, speed of processing, and/or hand-eye-body coordination. In some implementations, the individuals may be instructed and monitored by well-trained coaches and be under peer pressure in both individual and team competitions for all the activities, and as such may not feel too exhausted and, instead, may have to make effort to focus on their performances.

The physical activities specifically may require sustained attention both internally and externally focused, response inhibition to multiple internal and external distractions, motor inhibition in games that require delayed action, multiple simultaneous attention, working memory directed attention and pattern generated motor activity. Although most of the body activities involve several of these cognitive functions, each more heavily draws on some rather than other cognitive operations as indicated below. Some physical exercises include at least one of the following in at least one of the categories listed below:

1. Simple sustained internally focused attention and response inhibition:
    motor skills like running, jumping, skipping, etc.;
    balance training, such as, toes walking, one foot standing, standing on a ball walking on a beam, walking with a cup on head, etc.;
    group games and competitions, such as, relay races for all these movements; and
    red light-green light run and stop game (attention and response inhibition).
2. Simple sustained externally focused attention and response inhibition:
    ball skills such as handing a ball from person to person, throwing, catching, shooting baskets and kicking a ball;
    imitating dance movements; and
    "Simon Says" imitation game (attention and response inhibition).
3. Divided and multiple simultaneous attention:
    jump rope individually and in groups of two or three;
    juggling—from one to three balls by a single individual;
    juggling—from one to three balls two individuals together; and
    team sports—soccer (or any other team sport).
4. Internally working memory driven attention and pattern generation with body movements:
    aerobic dance;
    imitation of animal movements and other unusual movement sequences; and
    martial arts.

In some implementations, the use of physical exercises in conjunction with the cognitive exercises may have an effect of having individuals spend more time activating target processes of neurocognitive systems. Such combination of exercises also may extend the exercise from the computer environment to a context of whole body movement and from one of individual activity to a social context. This may promote generalization of training gains from a narrow context specific one to broader impact on function. Further, in some implementations, an exercise program may be developed based on the neurocognitive development of the individual and may target specific development of neurocognitive processes to choose specific activities from a wide variety of sports, gymnastics, dance, martial arts, etc.

Figure 3:
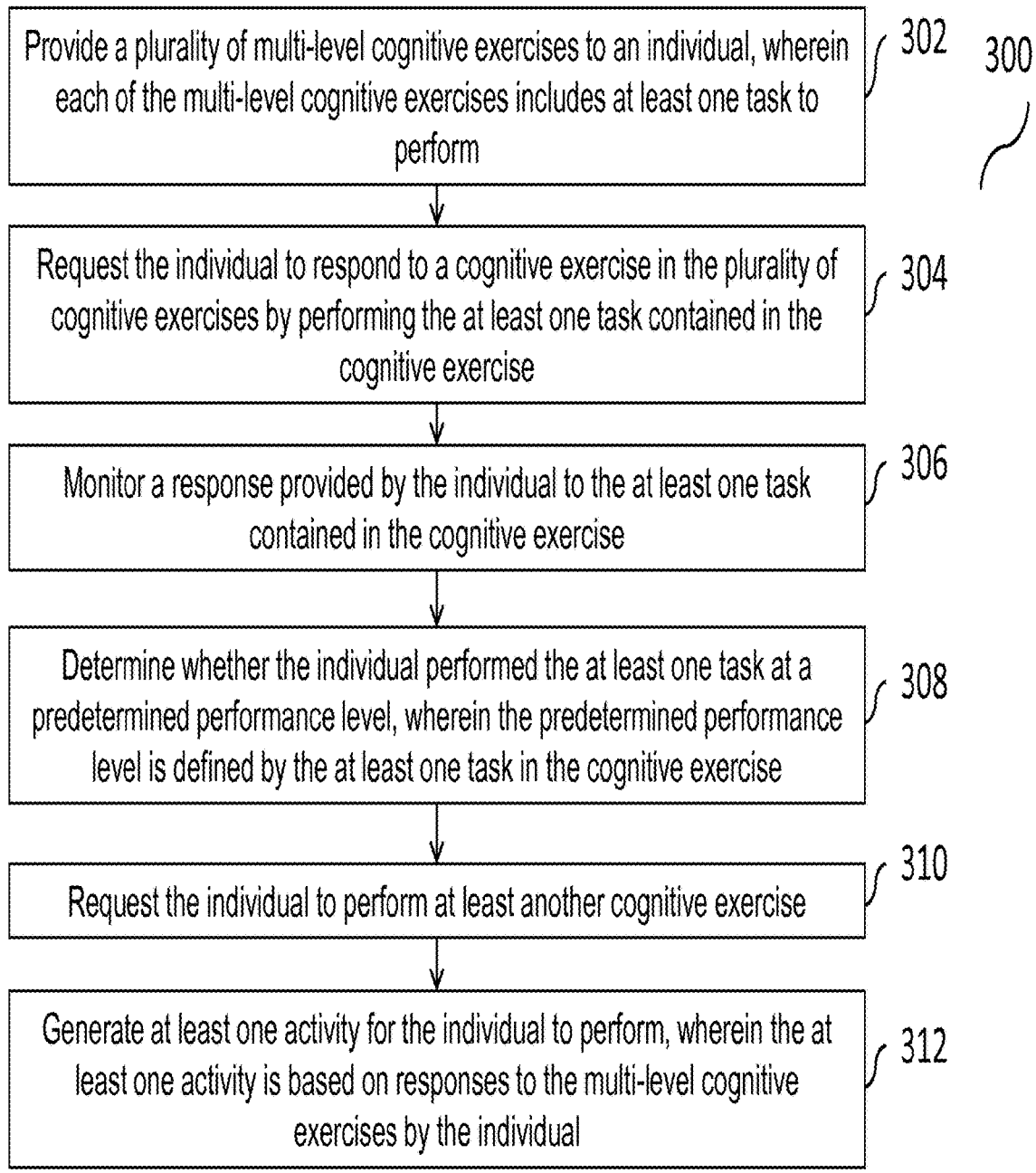
FIG. 3 illustrates a method, according to some implementations of the current subject matter.

FIG. 3 illustrates an exemplary method 300 according to some implementations of the current subject matter. At 302, a plurality of multi-level cognitive exercises is provided to an individual, wherein each of the multi-level cognitive exercises includes at least one task to perform (e.g., a problem to solve). At 304, the individual is requested to respond to a cognitive exercise in the plurality of cognitive exercises by performing the at least one task contained in the cognitive exercise. At 306, a response provided by the individual to the cognitive exercise is monitored. At 308, based on the monitoring, a determination is made whether the individual performed the at least one task at a predetermined performance level, wherein the performance level is defined by the at least one task contained in the cognitive exercise. For example, at 308, it can be determined whether the individual's performance meets the plateau criteria, graduation criteria, and/or both. At 310, based on the determining, the individual is requested to perform at least another task. At 312, at least one activity for the individual to perform is generated, wherein the at least one activity is based on responses to the multi-level cognitive exercises by the individual.

In some implementations, the current subject matter can include at least one of the following optional features. At least another task can include at least one of the following: at least another task in the cognitive exercise, at least one task in another cognitive exercise in the plurality of multi-level cognitive exercises, and the at least one task that has been altered. At least one activity can include at least one of the following: at least one cognitive exercise and at least one physical activity. Based on the generated activity, an individual development plan for the individual can be generated. Each level in the multi-level cognitive exercises contains a different task to perform, wherein each next level in the multi-level cognitive exercises contains a more difficult task to perform than a task in a preceding level in the multi-level cognitive exercises. The individual is not allowed to perform a task contained in the next level until the individual correctly performs a task contained in the preceding level. The monitoring further includes determining that the individual incorrectly performed the at least one task; generating an error message indicating that the individual incorrectly performed the task, analyzing a performance of the at least one task by the individual, providing, based on the analyzing, a suggestion to the individual on how to correctly perform the at least one task, and allowing the individual to perform the at least one task again. The analyzing further includes determining an error type corresponding to the incorrect performance of the at least one task by the individual. The generating the error message further includes generating an alert to the individual indicating the error message, wherein the alert includes at least one of the following: an audio message, a video message, and a combination of an audio message and a video message. The at least another task can include the at least one task that has been altered based on the error type. The monitoring further includes defining, based on the predetermined performance level, at least one plateau performance criterion to indicate performance of the at least one task by the individual at a first performance level, at least one graduation performance criterion to indicate performance of the at least one task by the individual at a second performance level, wherein the second performance level is higher than the first performance level, determining a performance level at which the individual performed the at least one task and whether the individual correctly performed the at least one task, and comparing, based on the determining, the performance level at which the individual performed the at least one task with the at least one of the first performance level and the second performance level. The method can also include allowing the individual to perform at least another task included in the multi-level cognitive exercises based on the individual performing the at least one task at least one of the first performance level and the second performance level. At least one performance level, the first performance level, the second performance level can include at least one of the following: a predetermined time allotted for performance of the at least one task, a predetermined speed for performing the at least one task, and a predetermined accuracy of performing the at least one task. The method can also include determining whether the individual correctly and at at least one of the first predetermined level and the second predetermined level predetermined for each task performed all tasks in the plurality of multi-level cognitive exercises, allowing, based on the determination, the individual to perform at least another task contained within at least another plurality of multi-level cognitive exercises.

EXAMPLES

The following is a discussion of experimental game examples conducted using system 200 discussed above. The discussion identifies various levels, associated error types, message criteria, feedback, auditory and/or visual messages, and training aids for each of the experimental games.

Example 1

Online Error Diagnostics and Corrective Strategy Messaging for Catch the Ball

As illustrated below, each error type may be determined based on a number of hits/misses that the individual had and/or any other criteria. The messages/feedback may be generated based on the error. Further, upon completion of one level, the individual is permitted to proceed to the next higher level. The following is a description of the "catch-the-ball" exercise, difficulty dimensions, design, speed adjustments and difficulty levels.

General Task Description:

Balls appear and bounce around on the screen. The individual has to move a cursor (which may look like a hand) to "catch" balls of specified colors before they bounce off the screen. Balls collect in vertical container on the side of the screen as the individual catches them to indicate success. In some difficulty levels, the color of the balls to catch (the "target") changes, as described below. When this is the case, the correct target color is indicated in one of the corners of the screen.

Difficulty Dimensions:
1. Number of balls on the screen
2. Balls move in different directions
3. Complexity of rules for collecting balls
4. Speed at which balls move—adaptively tracked.

The design of the "catch-the-ball" exercise may be as follows:
1. As individuals play it, the exercise changes in two different ways: Speed and Difficulty Level.
2. The exercise begins at the easiest difficulty level and the slowest speed.
3. The difficulty level remains the same, and speed is adjusted based on the individual's performance as indicated below.
4. When the individual reaches a certain level of speed and accuracy (i.e., a graduation criterion, as described below), or becomes "stuck" at the same speed and accuracy level (i.e., a plateau criterion, as described below) the game moves to the next difficulty level. Play at the new difficulty level begins at half the speed achieved at the previous level.

5. There may be 630 difficulty levels as defined below (other number of difficulty levels is possible).

Speed can be adjusted as follows:
1. Speeds:
   a. Initial and slowest speed: 10 seconds to traverse the screen in a straight line
   b. Fastest speed: 2 seconds to traverse the screen in a straight line
2. Algorithm for adjusting speed:
   a. 3 consecutive correct, then increase speed by 10%
   b. 2 consecutive errors, then decrease speed by 10%
3. Graduation criterion: 5 consecutive correct at fastest speed
4. Plateau criterion: 10 alternations between two speeds without advancing to a faster speed.
5. Subjects move to the next difficulty level by reaching either graduation or plateau criterion.

Catch—the ball game can include the following difficulty levels:
1. Balls are initially a light yellow color and change to the colors of targets or foils for periods of time as indicated in the table below. Changes take place at random intervals ranging from 1.5 to 3.5 seconds.
2. The target color is indicated in a stationary ball on the top of the screen.
3. The Table A below indicates the first 54 difficulty levels in order of least to more difficult.
4. For these first 63 levels, only one ball moves across the screen at a time. The difficulty levels are a function of 3 parameters: 1) the number of different colors the ball can become; 2) the length of time a particular color remains; and 3) the rule defining targets.
5. These 54 levels are to be repeated with more than one ball moving across the screen as follows:
   a. Levels 64-126: 2 balls moving in the same direction
   b. Levels 127-189: 2 balls moving in opposite directions
   c. Levels 190-252: 3 balls moving in the same direction
   d. Levels 253-315: 3 balls, 2 moving in one direction
6. These 315 levels (except for the trials with only red color balls) are to be repeated again with the screen divided in half and the target different colors on the two sides of the screen. One side of the screen will begin with the target blue and the other red, and each will change according to the same rule being applied to both sides. Balls will move across the whole screen (i.e., across the divide in the middle of the screen) just as in the first 315 trials, but now the target color may change when the ball crosses from one side to the next.

TABLE A

DIFFICULTY LEVELS

| #of Stimuli | Colors | Target or Foil Duration | Rule |
|---|---|---|---|
| 1 | Red | 1.5 sec | Catch Red Balls |
|  | Red | 1.25 sec |  |
|  | Red | 1.0 sec |  |
|  | Red | 0.8 sec |  |
|  | Red | 0.6 sec |  |
|  | Red | 0.5 sec |  |
|  | Red | 0.4 sec |  |
|  | Red | 350 msec |  |
|  | Red | 300 msec |  |
| 1 | Blue, Red | 1.5 sec | Catch Red Balls |
|  | Blue, Red | 1.25 sec |  |
|  | Blue, Red | 1.0 sec |  |

TABLE A-continued

DIFFICULTY LEVELS

| #of Stimuli | Colors | Target or Foil Duration | Rule |
|---|---|---|---|
|  | Blue, Red | 0.8 sec |  |
|  | Blue, Red | 0.6 sec |  |
|  | Blue, Red | 0.5 sec |  |
|  | Blue, Red | 0.4 sec |  |
|  | Blue, Red | 350 msec |  |
|  | Blue, Red | 300 msec |  |
| 1 | Blue, Red | 1.5 sec | Catch Red or Blue as |
|  | Blue, Red | 1.25 sec | Target Indicates |
|  | Blue, Red |  | (Target shifts at random |
|  | Blue, Red |  | intervals from |
|  | Blue, Red |  | 3 to 6 targets with chime |
|  | Blue, Red |  | signaling change) |
|  | Blue, Red |  |  |
|  | Blue, Red |  |  |
|  | Blue, Red | 300 ms |  |
| 1 | Blue, Red, Green | 1.5 sec | Catch Red or Blue as |
|  | Blue, Red, Green | 1.25 sec | Target Indicates |
|  | Blue, Red, Green |  | (Target shifts at random |
|  | Blue, Red, Green |  | intervals from |
|  | Blue, Red, Green |  | 3 to 6 targets with chime |
|  | Blue, Red, Green |  | signaling change) |
|  | Blue, Red, Green |  |  |
|  | Blue, Red, Green |  |  |
|  | Blue, Red, Green | 300 ms |  |
| 1 | Blue, Red | 1.5 sec | Catch Red or Blue as |
|  | Blue, Red | 1.25 sec | Target Indicates (Target |
|  | Blue, Red |  | switches after every |
|  | Blue, Red |  | trial) |
|  | Blue, Red |  |  |
|  | Blue, Red |  |  |
|  | Blue, Red |  |  |
|  | Blue, Red |  |  |
|  | Blue, Red | 300 ms |  |
| 1 | Blue, Red, Green | 1.5 sec | Catch Red or Blue as |
|  | Blue, Red, Green | 1.25 sec | Target Indicates (Target |
|  | Blue, Red, Green |  | switches after every |
|  | Blue, Red, Green |  | trial) |
|  | Blue, Red, Green |  |  |
|  | Blue, Red, Green |  |  |
|  | Blue, Red, Green |  |  |
|  | Blue, Red, Green | 300 ms |  |
| 1 | Blue, Red, Green | 1.5 sec | Catch any ball that |
|  | Blue, Red, Green | 1.25 sec | turns the same color |
|  | Blue, Red, Green |  | twice in a row (use all |
|  | Blue, Red, Green |  | three colors as targets) |
|  | Blue, Red, Green |  |  |
|  | Blue, Red, Green |  |  |
|  | Blue, Red, Green |  |  |
|  | Blue, Red, Green |  |  |
|  | Blue, Red, Green | 300 ms |  |

The following Tables 1-8 indicate various error types and corresponding messages that may be generated for the catch-the-ball exercise.

TABLE 1

| Level 1 | | |
|---|---|---|
| Error type 1: | Miss the balls with no click Message criterion | miss two out of five targets |
|  | Auditory Message: | "Remember, try and catch all the balls that turn red" |
|  | Visual message: | Have the ball stop moving and flash red on and off |
|  | Positive feedback | Give a big smiley face when they first correctly click on the target after the corrective messages. |
| Error type 2: | Miss the balls with click outside of the ball Message criterion | miss two out of five targets |

TABLE 1-continued

Level 1

| | | |
|---|---|---|
| | Auditory Message: | "You are doing a good job seeing the red balls to catch, but you are not moving the little hand (or cursor) onto the balls before you click the mouse. You have to get the little hand onto the balls before you click the mouse. We will make the balls bigger for a little while you get better at clicking on them." |
| | Visual message: | Have the ball stop moving and show the cursor moving onto it before there are the words "click now" and the sound of a successful on-target click is played. |
| | Training Aid | Make the target balls 33% bigger for the next 10 targets. |
| | Positive feedback: | Give a big smiley face when they first correctly click on the target after the corrective messages. |
| Error type 3: | Miss the balls with late click | |
| | Message criterion: | miss two out of five targets |
| | Auditory Message: | "You are doing a good job seeing the red balls to catch, but you are not catching them fast enough. You have to get the little hand onto the balls more quickly before you click the mouse. There are two strategies that might help you. One, you can try to keep moving the little hand along with the ball so you will be ready to catch it when it turns red. Two, look where they balls are going, move the little hand to there and let the ball come to you. That way you do not have to chase after them so much. We will give you some extra time to click on the balls for a little while you get better at catching them." |
| | Visual message: | Illustrate the cursor moving along with the ball and call it strategy one. Illustrate moving the cursor to where the ball is headed and call it strategy two. |
| | Training Aid: | Make the response window 200 msec. longer for the next 10 targets. |
| | Positive feedback | Give a big smiley face when they first correctly click on the target after the corrective messages. |

TABLE 2

Level 2

| | | |
|---|---|---|
| Error type 1: | Miss the balls with no click - same messages and actions as for Level 1 | |
| Error type 2: | Miss the balls with click outside of the ball - same messages and actions as for Level 1. | |
| Error type 3: | Miss the balls with late click - same messages and actions as for Level 1. | |
| Error type 4: | Click on Blue balls | |
| | Message criterion: | click on two out of five blue balls |
| | Auditory Message: | "Remember, you are only trying to catch the balls that turn red." |
| | Visual message: | Show a blue ball and write in big letters "Do not catch the blue balls". |
| | Positive feedback: | Give big smiley face when the first two times they correctly ignore a blue ball after the corrective messages. |

TABLE 3

Level 3 (target switches between red and blue)

| | | |
|---|---|---|
| Error type 1: | Fail to switch target as indicated either by failing to click on the new target OR clicking on the old target after the switch. | |
| | Message criterion: | Errors on the first two stimuli after the target switches. |
| | Auditory Message: | "Whoops the target color changed and you did not start catching the new color!" |
| | Visual message: | Show an illustration of the target color changing the stimuli that follow on two parallel lines, and indicate the correct responses after the switch on one line and the incorrect ones on the other line. |
| | Positive feedback: | Give big smiley face when the next two times they correctly switch targets. |
| Error type 2: | Miss the balls with click outside of the ball - same messages and actions as for Level 1. | |
| Error type 3: | Miss the balls with late click - same messages and actions as for Level 1. | |
| Error type 4: | Click on wrong color ball after having made one correct click on the current correct target. | |
| | Message criterion: | Two of these types of errors out of five clicks |
| | Auditory Message: | "Whoops did you forget what the target color is? Try your best to remember what the target is. You can check on the side of the screen if you are not sure." |
| | Visual message: | Show an illustration of the game background and circle where the current target color is indicated. |
| | Positive feedback: | Give big smiley face when they next correctly identify two targets in a row. |

TABLE 4

Level 4 (target switches between red and blue and there are also green balls):

| | | |
|---|---|---|
| Error type 1: | Fail to switch target as indicated either by failing to click on the new target OR | |

TABLE 4-continued

Level 4 (target switches between red and blue and there are also green balls):

| | | |
|---|---|---|
| | clicking on the old target after the switch. | |
| | Message criterion: | Errors on the first two stimuli after the target switches. |
| | Auditory Message: | "Whoops the target color changed and you did not start catching the new color!" |
| | Visual message: | Show an illustration of the target color changing the stimuli that follow on two parallel lines, and indicate the correct responses after the switch on one line and the incorrect ones on the other line. |
| | Positive feedback: | Give big smiley face when the next two times they correctly switch targets. |
| Error type 2: | Miss the balls with click outside of the ball - no messaging. | |
| Error type 3: | Miss the balls with late click - no messaging. | |
| Error type 4: | Click on wrong color ball after having made one correct click on the current correct target. | |
| | Message criterion: | Two of these types of errors out of five clicks (This might mean errors in a span of trials that includes a target color switch in the middle. In this case this type of error does not register until the first correct response after the target switch.) |
| | Auditory Message: | "Whoops did you forget what the target color is? Try your best to remember what the target is. You can check on the side of the screen if you are not sure." |
| | Visual message: | Show an illustration of two sequences of balls in parallel lines one with green balls and one without. Indicate the correct responses on the line without green balls and the fact that the balls following green ones on the other line are not correct. |
| | Positive feedback: | Give big smiley face when they next correctly ignore a blue following a red or a red following a blue with a green in between them. |
| Error type 5: | Click on green ball at any time. | |
| | Message Criterion: | click on two out of ten green balls. |
| | Auditory Message: | "Whoops green balls are never a target." |
| | Visual Message: | Show green ball with an X on it. |

TABLE 5

Level 5 (target is red after red or blue after blue; no green balls):

| | | |
|---|---|---|
| Error type 1: | Miss a target with no click | |
| | Message criterion: | Miss two out of five targets. |
| | Auditory Message: | Remember, every time the ball is the same color as the one before, you need to catch it. Keep the color of the ball you just saw in your mind so you will know what balls to catch. |
| | Visual message: | Show sequence of 5 balls with two targets and arrows pointing to the targets. |
| | Positive feedback: | Give smiley face or other congratulations after they correctly click on two successive targets. |
| Error type 2: | Miss a target with click outside of the ball- no messaging. | |
| Error type 3: | Miss a target with late click- no messaging. | |
| Error type 4: | False click on a red or blue ball | |
| | Message criterion: | Clicks on 2/5 foils. |
| | Auditory message: | "Remember, it is only a target when it is the same color as the ball before. Do your best to remember the color of the last ball you saw so that you know whether or not to catch the next one." |
| | Visual message: | Show the same sequence of 5 balls as for Error message # 1 but indicate "not a target" and "do not catch" for the foils. |

TABLE 6

Level 6 (target is red after red or blue after blue; with green balls):

| | | |
|---|---|---|
| Error type 1 | Miss target with no click | |
| | Message criterion | Miss 2/5 targets. |
| | Auditory Message | Remember, every time the ball is the same color as the one before, you need to catch it. Keep the color of the ball you just saw in your mind so you will know what balls to catch. |
| | Visual message | Show sequence of 5 balls with two targets and arrows pointing to the targets. |
| | Positive feedback | Give smiley face or other congratulations after they correctly click on two successive targets. |
| Error type 2 | Miss a target with click outside of the ball- no messaging. | |
| Error type 3 | Miss a target with late click- no messaging. | |
| Error type 4 | False click on a red or blue ball | |
| | Message criterion | Clicks on 2/5 foils. |
| | Auditory message | "Remember, it is only a target when it is the same color as the ball before. Do your best to remember the color of the last ball you saw so that you know whether or not to catch the next one." |
| | Visual message | Show the same sequence of 5 balls as for Error message # 1 but indicate "not a target" and "do not catch" for the foils. |
| Error type 5 | False click on a red or blue ball after a green ball | |
| | Message criterion | Two of this type of error out of five times when there is a sequence R-G-R or B-G-B. |
| | Auditory Message | "Whoops, there was a green ball just before the ball you |

TABLE 6-continued

Level 6 (target is red after red or blue after blue; with green balls):

| | | |
|---|---|---|
| | Visual message | clicked on. If there is a green ball it means that the next red of blue ball is coming after a green ball and not after a red or blue ball. There can never be a correct response after a green ball." Show a sequence of 6 balls with two correct targets indicated by arrows and then two that would have been targets except that the green ball between them means they are not targets. Indicate these "non-targets" with the green in between as "not a target" and "do not catch". |
| Error type 6 | False click on a green ball | |
| | Message Criterion | click on 2/10 green balls. |
| | Auditory Message | "Whoops, green balls are never a target." |
| | Visual Message | Show green ball with an X on it. |

TABLE 7

Level 7 (target is red after blue or blue after red; no green balls):

| | | |
|---|---|---|
| Error type 1 | Miss a target with no click | |
| | Message criterion | Miss 2/5 targets. |
| | Auditory Message | Remember, now every time the ball is a different color than the one before, you need to catch it. Keep the color of the ball you just saw in your mind so you will know what balls to catch. |
| | Visual message | Show sequence of 5 balls with two targets and arrows pointing to the targets. |
| | Positive feedback | Give smiley face or other congratulations after they correctly click on two successive targets. |
| Error type 2 | Miss a target with click outside of the ball - no messaging | |
| Error type 3 | Miss a target with late click - no messaging | |
| Error type 4 | False click on a red or blue ball | |
| | Message criterion | Clicks on 2/5 foils. |
| | Auditory message | "Remember, it is only a target when it is a different color from the ball before. Do your best to remember the color of the last ball you saw so that you know whether or not to catch the next one." |
| | Visual message | Show the same sequence of 5 balls as for Error message # 1 but indicate "not a target" and "do not catch" for the foils. |

Level 8 (target is red after blue or blue after red; with green balls):

| | | |
|---|---|---|
| Error type 1 | Miss a target with no click | |
| | Message criterion | Miss 2/5 of targets. |
| | Auditory Message | Remember, every time the ball is a different color than the one before, you need to catch it. Keep the color of the ball you just saw in your mind so you will know what balls to catch. |
| | Visual message | Show sequence of 5 balls with two targets and arrows pointing to the targets. |
| | Positive feedback | Give smiley face or other congratulations after they correctly click on two successive targets. |
| Error type 2 | Miss a target with click outside of the ball- no messaging. | |
| Error type 3 | Miss a target with late click- no messaging. | |
| Error type 4 | False click on a red or blue ball | |
| | Message criterion | Clicks on 2/5 foils. |
| | Auditory message | "Remember, it is only a target when it is a different color from the ball before. Do your best to remember the color of the last ball you saw so that you know whether or not to catch the next one." |
| | Visual message | Show the same sequence of 5 balls as for Error message # 1 but indicate "not a target" and "do not catch" for the foils. |
| Error type 5 | False click on a red or blue ball after a green ball | |
| | Message criterion | Two of this type of error out of five times when there is a sequence R-G-B or B-G-R. |
| | Auditory Message | "Whoops, there was a green ball just before the ball you clicked on. If there is a green ball it means that the next red of blue ball is coming after a green ball and not after a red or blue ball. There can never be a correct response after a green ball." |
| | Visual message | Show a sequence of 6 balls with two correct targets indicated by arrows and then two that would have been targets except that the green ball between them means they are not targets. Indicate these last two with the green in between are "not a target" and "do not catch". |
| Error type 6 | False click on a green ball | |
| | Message Criterion | click on 2/10 green balls. |
| | Auditory Message | "Whoops, green balls are never a target." |
| | Visual Message | Show green ball with an X on it. |

Example 2

"What Comes Next?" Game

The following is a brief description of this exercise. An individual may be presented with a screen having four stimulus windows on the upper row and three on the lower row (number of windows can be increased on both rows). The stimuli in the first row represent a sequential pattern or have a "story line." Individuals have to choose the stimulus on the second row that fits with the pattern or story line on the first row. For example: 2, 4, 6 predicts 8. Stimuli can be numbers, words, pictures and/or a mixture of any of the above. The individual may be provided with the following instructions:

"In this game you will see some pictures, numbers, characters or words in a row. The things you will see in the boxes will make a pattern or sequence. You will see some other pictures, numbers, characters or words in another set of boxes below the first boxes. Your task is to click on the picture, number, character or word on the second row that goes best with the pattern on the first row. Here are three examples:

Example 1: upper row has 3 red circles; lower row has a blue triangle and a red circle.

Example 2: upper row has a red circle, red square and red rectangle; lower row has a red triangle and a blue circle.

Example 3: upper row has red circle, blue triangle and red circle; lower row has a red circle and blue triangle."

If the correct choice is made, the box flashes bright colors and the stimulus selected on the second row appears in the open box on the first row. If the choice is wrong, the computer may generate a "thud" sound, the boxes in the lower row go blank and flash in dull gray, the same trial is repeated with the audio message is given to "try again". When the stimulus durations and inter-trial interval become short, the audio message is omitted.

The following speed adjustments may be made during this exercise:

For the first six trials, leave the stimuli on the screen until the individual responds. Record and average their response times and use this for an individualized starting point.

There is always 250 msec between the end of one stimulus presentation and the beginning of the next.

An exemplary algorithm for adjusting the speed may include the following criteria: (a) if three consecutive correct choices are made, then exposure time of the boxes is decreased by 10%, (b) if two consecutive errors are made, then the exposure time is increased by 10% up to a maximum of 200% of their starting time.

In order to advance forward, the individual may be required to meet a predetermined graduation criterion. Such criterion may include five consecutive correct choices made with an exposure time of 500 msec. Further, a predetermined plateau criterion may also be required of the individual. Such plateau criterion may include 10 alternations between two speeds without advancing to a faster speed. Upon reaching both criteria, the individual is permitted to advance forward.

Individual stimuli may be randomly selected from a current stimulus set, with the constraint that the same stimulus is not repeated more than twice in a row. The individual may be permitted to continue trying to advance to the next difficulty level by choosing a correct answer based on the stimuli until graduation or plateau criteria are met. The position of the correct response among the response choices in the boxes may vary randomly from trial to trial. The following illustrate some non-limiting examples of stimuli in this exercise:

Number sequences: 1-1-1-1; 1-2-3-4; 4-3-2-1; 1-1-2-2; 1-3-5-7; 1-2-4-7; 1-2-4-8;
2-3-5-9-17; 22-10-4-1;
Color and Shape sequences: R-R-R-R; R-B-R-B; R-B-Y-R-B
Size sequences: s-s-s-s; s-m-s-m;
Geometric forms: rotations; added or subtracted features
Amount sequences: amounts indicated increasing/decreasing etc w/out numbers.
Story lines with causality indicted.
Clock faces.

The following error types may be generated by the individual involved in this exercise:

1. Simple repetition of the same form or number;
2. Match by color;
2.1 All 4 forms the same color but different shapes;
3. Match by shape;
4. Two alternating forms;
5. One form alternating with same shape different color;
6. One form alternating with same color different shape;
7. One form alternating with different color different shape;
8. All 4 forms differ from one another in form and color;
9. Simple counting sequence;
10. Counting backwards;
11. Double repeats in numbers;
12. Counting by two's;
13. Counting backwards by two's;
14. Complex number sequence 1: up by 1, then 2, then 3, then 4;
15. Complex number sequence 2: up by alternating increments of 2 and 1;
16. Complex number sequence 3: up by 2 then down by 1, alternating;
17. Complex number sequence 4: add each number and the one before it to produce the next;
18. Complex number sequence 5: down 1 and up 2 alternating;
19. Complex number sequence 6: down 2 and up 1 alternating;
20. Complex number sequence 7: down 3 and up 2 alternating;
21. Time projections with numbers;
22. Time projections without numbers; and
23. Rotational errors.

Error Type 1 may produce auditory/visual messages based on the following message criterion:

Message criterion: 2 such errors in the last 5 such trials
Auditory message: "All the forms on the top row were exactly the same, so the rule was repeated in the same form. The correct answer was one more just like all the others."
Visual message: show three of the same forms, put a 4th in the last space, circle it, have an arrow point to it, and write "add one more of the same"

Error Types 2 and 3 may produce auditory/visual messages based on the following message criterion:

Message criterion: 2 such errors in a run of 5 such trials
Auditory message: "Now the things in the top row are not all exactly the same, but they are all the same color or same shape. If they are all the same shape, then you need to select another that is the same shape. If they are all the same color you have to select another that is the same color. Look out for the tricky ones where there are two choices that are the correct color. Then you have to figure out another reason to choose one!"
Visual message: show one example of the same shape and one of the same color on the screen at the same time. Point to and circle the correct choices and indicate in words "All the same shape" of "All the same color."

Error Types 4-8 and 11 may produce auditory/visual messages based on the following message criterion:

Message criterion: 3 such errors in last 6 trials.
Auditory message: "Remember, you have to look at the figures on the top row and figure out the rule for putting figures in their place. The two examples on the screen show two rules. There can also be other rules. You have to figure it out each time."

Visual message: Show 2 examples on the screen, one in the upper half and the other in the lower half. Point to the correct response and write the rule in words.

Error Types 9, 10, 12, and 13 may produce auditory/visual message based on the following message criterion:

Message criterion: 2 errors in the last 5 trial of this kind
Auditory message: "On this one you only have to count up or down to know what comes next. Sometimes you count by one and sometimes by 2."
Visual message: Show 2 examples again. The first counting down by 1 and the second counting up by 2.

For Error Types 14-20, the following may apply:
Message criterion: 3 errors in last 6 trials
Auditory message: "Problems like this are difficult. You have to look closely at how each number in the top row is related to the one before it in order to figure out the rule. Then use the rule to figure out what the next number should be."
Visual message: Show one example and spell out the rule: 1, 3, 4, 6 5, 7, 9
Show +2 between and above the 1 and 3 and the 4 and 6
Show +1 between and above the 3 and 4
Rule: increase by "2", then increase by "1", then by "2", then by "1"
So, you need to add "1" to 6 and the correct answer is "7"

For Error Types 21 and 22, the following may be applicable:
Message criterion: 3 errors in last 6 trials
Auditory message: "You have to look closely at the clocks on the top row and see how the time is moving forward. You can tell by how much the hands on each clock have moved compared to the one right before it. Once you see how far the hands move from one clock to the next, you will know what the next clock should be. The hands should keep changing the same amount from clock to clock."
Visual message: Show an example this example:
  i. 5:30, 6:30, 7:30 8:30, 9:00, 9:30
  Write: "Indicate visually how far the short arm has moved from each clock to the next. Then show that the same amount of movement added to the last one creates the correct answer."

With regard to Error Type 23, the following messages may be generated:
Message criterion: 3 errors in last 6 trials
Auditory message: Look closely and see how each figure in the top row changes from the one next to it. This will tell you what figure to choose from the second row.
Visual message:
  Choose an example of rotation of the figure by 90 degree steps
  Indicate with curved arrows the degree of rotation of each figure compared to the one before.
  Show how rotating the last figure in row one leads to the correct choice from row two.

Example 3

"Balloons/Butterflies" Game

The following is a brief description of this exercise. This exercise may be presented to children of a particular age (e.g., 6-8 years of age). As stated above, an object of this exercise is for the individual to recognize and/or identify objects that are being presented to him/her on the screen of a computer, where such objects may be carried by, for example, balloons and/or butterflies. Recognition/identification of objects is made by the individual taking into account various speeds, difficulty levels, etc. This experimental example will be described in terms of a game of balloons/butterflies as presented to children of 6-8 years of age.

The following speed adjustments, algorithm for adjusting speed, graduation criterion, and plateau criterion may be implemented in this exercise:
1. Speeds:
   a. Initial and slowest speed: 12 seconds to traverse the screen in a straight line
   b. Fastest speed: 2 seconds to traverse the screen in a straight line
2. Algorithm for adjusting speed:
   a. 3 consecutive correct, then increase speed by 10%
   b. 2 consecutive errors, then decrease speed by 10%
3. Graduation criterion: 5 consecutive correct at fastest speed
4. Plateau criterion: 10 alternations between two speeds without advancing to a faster level.
5. Individuals move to the next difficulty level by reaching either graduation or plateau criterion.

The following difficulty levels may be implemented in this exercise:
1. Balloons float from the bottom of the screen to the top carrying a little "sign" below on which we place different stimuli. In Bird or Butterfly versions, there are birds or butterflies that fly across the screen carrying similar little signs. Individuals may be asked to click on the balloons, birds or butterflies that carry appropriate targets before they leave the screen. When successful, there may be a sound and/or a visual confirmation (e.g., a thumbs up sign) generated, and the balloons the individuals click on may collect in a big bunch on the side of the screen and the butterflies/balloons collect in a cage and keep moving around in the cage. When a butterfly/balloon with a target gets to the end of the screen without being clicked on, or when the individual click on a butterfly/balloon that is not carrying a correct target, there is a different sound or other visual indication, and a balloon disappears from the ones they have collected. There is a stationary balloon in the upper left corner of the screen that may include the target category on it, which the individual may use as a reference point.
2. Difficulty levels may vary as a function of both the number of balloons or butterflies on the screen and the definitions of targets. There may be many sets of stimuli and many different target definitions—each target definition and accompanying stimulus set may constitute a specific "task" or difficulty level. The tasks may be ordered in a progression from easy to difficult.
3. Individuals may perform the exercises in 30 minute "sessions." During each session they may spend 7.5 minutes on each of three tasks or difficulty levels. They may begin with the three easiest tasks in order of increasing difficulty.
4. When starting a new task, the task begins with one balloon or butterfly moving at half the speed reached on the previous difficulty level. As the individual meets graduation or plateau criteria based on the speed adjustments and criteria above, a second balloon or bird is added to the screen. When there is more than one balloon or butterfly, they enter the screen with a slight delay between them (the delay could be 20% of the current transit time across the screen).

5. After the individual graduates or plateaus with three balloons or birds on a specific task, the individual may temporarily stop doing that task and the next task along the difficulty hierarchy is added to their schedule. When they reach graduation or plateau criteria with three balloons on another task, that task is temporarily removed from their schedule and the first task that had been dropped is resumed, but now they do the task with four, and then five and six balloons. When they reach graduation of plateau criteria on another of the three tasks they are doing, then a new task may be added to begin at one balloon. Thus, after the first graduation or plateau, the task may be replaced by a new task at one balloon starting difficulty. After the next graduation, a former task may be returned to and begun with four balloons. Thereafter, each task that reaches graduation or plateau may be replaced in alternating fashion by either a new task at one balloon difficulty or a former task at four balloon difficulty.

The following stimulus sets may be included in this exercise. Each stimulus set may have an increased difficulty with regard to objects being used and also include a various categories of objects that may be present in the stimulus set.

1. Category Sorting: Basic Numbers
    a. Instructions may be given in writing and/or through audio: "Click on all the balloons that carry a number or the name of a number. Here, watch some examples."
    b. In illustrative examples, the cursor may move on its own to click on the balloons/butterflies with audio explanation while it is happening. The illustrative examples may show that it would be an error to allow balloon/butterfly carrying the correct number to go off screen. The examples can also indicate that clicking on some foils may also be a mistake. The examples may also indicate that other foils that are not carrying the stimulus may go off the screen and that it would not be an error.
    c. Examples of basic numbers include: "2", "two", "three", etc.
    d. Examples of foils: apple, orange, etc.
2. Category Sorting: Animals
    a. Instructions as above except for the actual content which is: "Click on the balloons that are carrying pictures or names of animals."
    b. Illustrative examples may also be provided.
    c. Examples of animals include: dog, cat, giraffe, etc.
    d. Examples of foils include: shoes, table, etc.
3. Category Sorting: Food
    a. Instructions as above except for the actual content which is: "Click on the balloons that are carrying pictures or names of things to eat."
    b. Illustrative examples may also be provided.
    c. Examples of food include: dumplings, apple, orange, etc.
    d. Examples of foils include: dog, cat, shoes, etc.
4. Category Sorting: Furniture
    a. Instructions as above except for the actual content which is: "Click on the balloons that are carrying pictures or names of pieces of furniture."
    b. Illustrative examples may also be provided.
    c. Examples of furniture includes: table, chair, etc.
    d. Examples of foils include: dog, cat, apple, shoes, etc.
5. Category Sorting: Clothes
    a. Instructions as above except for the actual content which is: "Click on the balloons that are carrying pictures or names of things to wear."
    b. Illustrative examples may also be provided.
    c. Examples of clothes includes: shirt, pants, etc.
    d. Examples of foils include: dog, cat, apple, table, chair, etc.
6. Category Sorting: Clothes or Food
    a. Instructions as above except for the actual content which is: "Click on the balloons that are carrying pictures or names of things to wear or things to eat."
    b. Illustrative examples may also be provided.
    c. Examples of clothes or food includes: shirt, pants, dumplings, apple, etc.
    d. Examples of foils include: dog, cat, table, chair, etc.
7. Category Sorting: Big Animals
    a. Instructions as above except for the actual content which is: "Click on the balloons that are carrying pictures or names of big animals."
    b. Illustrative examples may also be provided.
    c. Examples of big animals includes: giraffe, elephant, etc.
    d. Examples of foils include: mouse, shoes, table, etc.
8. Category Sorting: Big and Small Animals Alternating
    a. Instructions are "First click on a picture or name of a small animal and then on one that is bigger than the first one. After that click on an animal that is smaller than the last one you clicked, and then on one that is larger. Continue to go back and forth between one that is smaller than one that is larger, and then one that is smaller and so on.
    b. In illustrative examples, the cursor may move on its own to click on the balloons/butterflies with audio explanation while it is happening. The illustrative examples may show that it would be a correct sequence to have a small animal (mouse) to a larger one (giraffe) to a smaller one (dog). The Examples may also show that it would not be correct to pick a rabbit because it is smaller than a dog and instead, a larger animal should be found. The system may indicate that an elephant should be picked because it is larger.
9. Category Sorting: Things that you find inside a house
10. Category Sorting: Things that you find outside of a house
11. Category Sorting: Things that you can both find inside and outside of a house
12. Category Sorting: Tools
    a. Instructions as above except for the actual content which is: "Click on the balloons that are carrying pictures or names of things used to that people use to help them do or build things."
13. Category Sorting: Things to Play with
    a. Instructions as above except for the actual content which is: "Click on the balloons that are carrying pictures or names of things to play with."
14. Category Sorting "Things to Take on Vacation"
    a. Instructions as above except for the actual content which is: "Click on the balloons that are carrying pictures or names of things to take with you on vacation."
15. Category Sorting: Things that go Together Because One is Used to Make the Other For categories 9-15, rules and illustrative examples similar to those discussed above may be applicable.

16. Find the Pairs: Numbers
    a. Instructions: "Now we will do something a little different. You will have to look at all the balloons on the screen and find two that go together in some way. Then click on both of them before they float up into the sky and off the screen. Here are some examples:"
b. To provide an illustration for the user, for this exercise, there may always be at least two balloons/butterflies on the screen at once. Here are some exemplary pairs that may be shown by the balloons/butterflies:
 i. "2" and TWO
 ii. "2" and **
 iii. "2" and * *
17. Find the Pairs: Any Two Things that go Together
 a. Instructions: "Now we will do something a little different. You will have to look at all the balloons on the screen and find two that go together in some way. Then click on both of them before they float up into the sky and off the screen. Here are some examples:"
 b. To provide an illustration for the user, for this exercise, there may always be at least two balloons/butterflies on the screen at once. Here are some exemplary pairs that may be shown by the balloons/butterflies:
  i. A picture of a "Match" and a picture of a "Fire"
  ii. A picture of an "Apple Tree" and a picture of a "Jar of Applesauce"
  iii. A picture of a "Chicken" and a picture of an "Egg"

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computerized system for providing individualized brain training to an individual using a computer-implemented multi-level cognitive exercise, wherein each level above a first level of the multi-level cognitive exercise has a task configuration of increased cognitive complexity, increased cognitive difficulty, or challenges a different cognitive component compared to an immediately preceding level, the system comprising:
   at least one storage device configured to store computer-executable instructions for the multi-level cognitive exercise;
   a display configured to display a graphical user interface, wherein the graphical user interface is configured to display a visualization associated with the multi-level cognitive exercise; and
   at least one computer processor programmed to:
      provide in the first level of the multi-level cognitive exercise, a task for the individual to perform by displaying on the graphical user interface a plurality of objects with which the individual is instructed to interact to perform the task;
      receive a plurality of responses from the individual via the graphical user interface as the individual performs the task within the first level by interacting with the plurality of objects displayed on the graphical user interface;
      continuously track a performance of the task by the individual within the first level by adjusting a difficulty setting of a component of the task within the first level based, at least in part, on an accuracy of the plurality of received responses;
      determine during the continuous tracking of the performance of the task by the individual within the first level, whether the performance of the task by the individual in the first level satisfies a graduation criterion or a plateau criterion for the multi-level cognitive exercise,
      wherein the graduation criterion specifies a number of correct responses received when the component of the task is set to a highest difficulty setting within a current level of the multi-level cognitive exercise, and
      wherein the plateau criterion specifies a metric by which it is determined that performance of the task by the individual within the current level is not continuing to improve prior to satisfying the graduation criterion; and
      advance the multi-level cognitive exercise from the first level to a second level of the multi-level cognitive exercise when it is determined that the performance of the task by the individual in the first level satisfies the graduation criterion or the plateau criterion,
      wherein advancing the multi-level cognitive exercise from the first level to the second level comprises providing, via the graphical user interface, a modified task for the individual to perform,
      wherein the modified task has increased cognitive complexity, increased cognitive difficulty, or challenges a different cognitive component compared to the task performed in the first level, and
      wherein providing, via the graphical user interface, the modified task for the individual to perform comprises, compared to providing the task in the first level, one or more of displaying additional objects on the graphical user interface, changing a manner in which the plurality of objects are displayed, and increasing a complexity of a rule for performing the task.

2. The computer system of claim 1, wherein the at least one processor is further programmed to:
   continuously track a performance of the modified task by the individual within the second level by adjusting a difficulty of a component of the modified task within the second level based, at least in part, on an accuracy of a plurality of responses received from the individual as the individual performs the modified task within the second level;
   determine during continuous tracking of the performance of the modified task by the individual within the second level, whether the performance of the modified task by the individual in the second level satisfies the graduation criterion or the plateau criterion; and
   advance the multi-level cognitive exercise from the second level to a third level of the multi-level cognitive exercise when it is determined that the performance of the modified task by the individual in the second level satisfies the graduation criterion or the plateau criterion for the multi-level cognitive exercise.

3. The computer system of claim 1, wherein the modified task introduces an increased cognitive complexity compared to the task provided in the first level by increasing a number of objects displayed on the graphical user interface during performance of the modified task.

4. The computer system of claim 1, wherein the modified task introduces an increased cognitive complexity compared to the task provided in the first level by increasing a complexity of a rule for performing the task.

5. The computer system of claim 1, wherein the modified task introduces an increased cognitive complexity compared to the task provided in the first level by changing a manner in which the plurality of objects are displayed on the graphical user interface during performance of the modified task.

6. The computer system of claim 1, wherein the modified task introduces an increased cognitive complexity compared to the task provided in the first level by introducing additional distractor components via the graphical user interface that the individual is instructed to ignore during performance of the modified task.

7. The computer system of claim 1, wherein adjusting a difficulty setting of a component of the task comprises adjusting an amount of time during which the individual has available to perform the task.

8. The computer system of claim 1, wherein adjusting a difficulty setting of a component of the task comprises increasing a speed of the component when a first number of consecutive correct responses is received and decreasing the speed of the component when a second number of consecutive incorrect responses is received.

9. The computer system of claim 8, wherein the first number and the second number are different.

10. The computer system of claim 1, wherein the metric specified for the plateau criterion is a number of times the difficulty setting of the component of the task has alternated between two difficulty settings of the component of the task in the current level without advancing to a greater difficulty setting.

11. A computer-implemented method of providing individualized brain training to an individual using an computer-implemented multi-level cognitive exercise, wherein each level above a first level of the multi-level cognitive exercise has a task configuration of increased cognitive complexity compared to an immediately preceding level, the method comprising:
storing, on at least one storage device, computer-executable instructions for the multi-level cognitive exercise;
providing in the first level of the multi-level cognitive exercise, a task for the individual to perform by displaying on a graphical user interface, a plurality of objects with which the individual is instructed to interact to perform the task;
receiving a plurality of responses from the individual via the graphical user interface as the individual performs the task within the first level by interacting with the plurality of objects displayed on the graphical user interface;
continuously tracking a performance of the task by the individual within the first level by adjusting a difficulty setting of a component of the task within the first level based, at least in part, on an accuracy of the plurality of received responses;
determining during the continuous tracking of the performance of the task by the individual in the first level whether the performance of the task by the individual in the first level satisfies a graduation criterion or a plateau criterion for the multi-level cognitive exercise,
wherein the graduation criterion specifies a number of correct responses received when the component of the task is set to a highest difficulty setting within a current level of the multi-level cognitive exercise, and
wherein the plateau criterion specifies a metric by which it is determined that performance of the task by the individual within the current level is not continuing to improve prior to satisfying the graduation criterion; and
advancing the multi-level cognitive exercise from the first level to a second level of the multi-level cognitive exercise when it is determined that the performance of the task by the individual in the first level satisfies the graduation criterion or the plateau criterion,
wherein advancing the multi-level cognitive exercise from the first level to the second level comprises providing, via the graphical user interface, a modified task for the individual to perform,
wherein the modified task has increased cognitive complexity, increased cognitive difficulty, or challenges a different cognitive component compared to the task performed in the first level, and wherein providing, via the graphical user interface, the modified task for the individual to perform comprises, compared to providing the task in the first level, one or more of displaying additional objects on the graphical user interface, changing a manner in which the plurality of objects are displayed, and increasing a complexity of a rule for performing the task.

12. The computer-implemented method of claim 11, wherein the modified task introduces an increased cognitive complexity compared to the task provided in the first level by:
(i) increasing a number of objects displayed on the graphical user interface during performance of the modified task;
(ii) increasing a complexity of a rule for performing the task;
(iii) changing a manner in which the plurality of objects are displayed on the graphical user interface during performance of the modified task;
(iv) introducing additional distractor components provided via the graphical user interface, that the individual is instructed to ignore during performance of the modified task; or
(v) any combination of one or more of (i)-(iv).

13. The computer-implemented method of claim 11, wherein adjusting a difficulty setting of a component of the task comprises adjusting an amount of time during which the individual has available to perform the task.

14. The computer-implemented method of claim 11, wherein adjusting a difficulty setting of a component of the task comprises increasing a speed of the component when a first number of consecutive correct responses is received and decreasing the speed of the component when a second number of consecutive incorrect responses is received.

15. The computer-implemented method of claim 14, wherein the first number and the second number are different.

16. The computer-implemented method of claim 11, wherein the metric specified for the plateau criterion is a number of times the difficulty setting of the component of the task has alternated between two difficulty settings in the current level without advancing to a higher difficulty setting.

17. A non-transitory computer readable medium encoded with a plurality of instructions that, when executed by at least one computer processor, perform a method of providing individualized brain training to an individual using an computer-implemented multi-level cognitive exercise, wherein each level above a first level of the multi-level cognitive exercise has a task configuration of increased cognitive complexity, increased cognitive difficulty, or challenges a different cognitive component compared to an immediately preceding level, the method comprising:
storing, on at least one storage device, computer-executable instructions for the multi-level cognitive exercise;
providing in the first level of the multi-level cognitive exercise, a task for the individual to perform by displaying on a graphical user interface, a plurality of objects with which the individual is instructed to interact to perform the task;
receiving a plurality of responses from the individual via the graphical user interface as the individual performs the task within the first level by interacting with the plurality of objects displayed on the graphical user interface;
continuously tracking a performance of the task by the individual within the first level by adjusting a difficulty setting of a component of the task within the first level based, at least in part, on an accuracy of the plurality of received responses;

determining during the continuous tracking of the performance of the task by the individual in the first level whether the performance of the task by the individual in the first level satisfies a graduation criterion or a plateau criterion for the multi-level cognitive exercise, wherein the graduation criterion specifies a number of correct responses received when the component of the task is set to a highest difficulty setting within a current level of the multi-level cognitive exercise, and wherein the plateau criterion specifies a metric by which it is determined that performance of the task by the individual within the current level is not continuing to improve prior to satisfying the graduation criterion; and advancing the multi-level cognitive exercise from the first level to a second level of the multi-level cognitive exercise when it is determined that the performance of the task by the individual in the first level satisfies the graduation criterion or the plateau criterion, wherein advancing the multi-level cognitive exercise from the first level to the second level comprises providing, via the graphical user interface, a modified task for the individual to perform, wherein the modified task has increased cognitive complexity, increased cognitive difficulty, or challenges a different cognitive component compared to the task performed in the first level, and wherein providing, via the graphical user interface, the modified task for the individual to perform comprises, compared to providing the task in the first level, one or more of displaying additional objects on the graphical user interface, changing a manner in which the plurality of objects are displayed, and increasing a complexity of a rule for performing the task.

18. The computer readable medium of claim 17, wherein the modified task introduces an increased cognitive complexity compared to the task provided in the first level by:
(i) increasing a number of objects displayed on the graphical user interface during performance of the modified task;
(ii) increasing a complexity of a rule for performing the task;
(iii) changing a manner in which the plurality of objects are displayed on the graphical user interface during performance of the modified task;
(iv) introducing additional distractor components provided via the graphical user interface, that the individual is instructed to ignore during performance of the modified task; or
(v) any combination of one or more of (i)-(iv).

19. The computer readable medium of claim 17, wherein adjusting a difficulty setting of a component of the task comprises adjusting an amount of time during which the individual has available to perform the task.

20. The computer readable medium of claim 17, wherein the metric specified for the plateau criterion is a number of times the difficulty setting of the component of the task has alternated between two difficulty settings in the current level without advancing to a faster difficulty setting.

\* \* \* \* \*